FIG. 4.

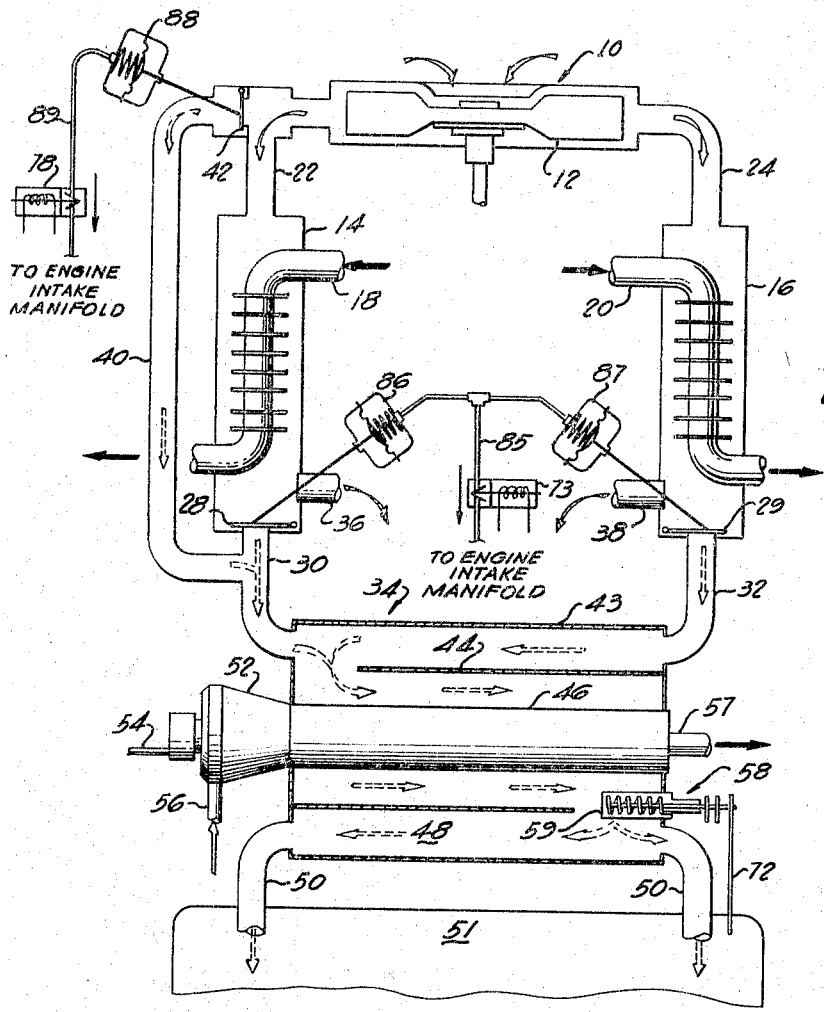

PROGRAM CHART FOR HEATER SYSTEM (FIG. 1.)

| SYSTEM | CITY DRIVING | HIGHWAY 50 M.P.H. | IDLE | STEEP UPHILL | STEEP DOWNHILL |
|---|---|---|---|---|---|
| VEHICLE HEAT EXCHANGE VALVES 28,29 | −20° OPEN −29<br>+40° OPEN 5<br>+60 CYCLING 16<br>+90 CLOSED 32 | −20° OPEN<br>+40° CYCLING<br>+60 CYCLING<br>+90 CLOSED | −20° OPEN<br>+40° OPEN<br>+60 CYCLING<br>+90 CLOSED | −20° OPEN<br>+40° CYCLING<br>+60 CYCLING<br>+90 CLOSED | −20° OPEN<br>+40° OPEN<br>+60 CYCLING<br>+90 CLOSED |
| BY PASS VALVE 42 | −20° CLOSED−29<br>+40 CLOSED 5<br>+60 CYCLING 16<br>+90 OPEN 32 | −20° CLOSED<br>+40 CYCLING<br>+60 CYCLING<br>+90 OPEN | −20° CLOSED<br>+40 CLOSED<br>+60 CYCLING<br>+90 OPEN | −20° CLOSED<br>+40 CYCLING<br>+60 CYCLING<br>+90 OPEN | −20° CLOSED<br>+40 CLOSED<br>+60 CYCLING<br>+90 OPEN |
| BOOSTER HEATER 32 | −20° CYCLING−29<br>+40 CYCLING 5<br>+60 OFF 16<br>+90 OFF 32<br>F°    C° | −20° CYCLING<br>+40 OFF<br>+60 OFF<br>+90 OFF | −20° CYCLING<br>+40 CYCLING<br>+60 OFF<br>+90 OFF | −20° CYCLING<br>+40 OFF<br>+60 OFF<br>+90 OFF | −20° CYCLING<br>+40 CYCLING<br>+60 OFF<br>+90 OFF |

INVENTORS
Gordon J. Fairbanks
Vernon N. Tramontini

By William J. Newman
Attorney

June 13, 1967   G. J. FAIRBANKS ETAL   3,325,100
VEHICLE HEATING SYSTEM

Filed March 9, 1965   13 Sheets-Sheet 3

INVENTORS
Gordon J. Fairbanks
Vernon N. Tramontini

By William J. Newman
Attorney

June 13, 1967  G. J. FAIRBANKS ETAL  3,325,100

VEHICLE HEATING SYSTEM

Filed March 9, 1965  13 Sheets-Sheet 4

INVENTORS
Gordon J. Fairbanks
Vernon N. Tramontini

By William J. Newnam
Attorney

June 13, 1967

G. J. FAIRBANKS ETAL 3,325,100

VEHICLE HEATING SYSTEM

Filed March 9, 1965

INVENTORS
Gordon J. Fairbanks.
Vernon N. Tramontini

By William J. Newnam
Attorney

FIG. 11.

PROGRAM CHART FOR HEATER SYSTEM (FIG.9)

| SYSTEM | | CITY DRIVING | HI-WAY DRIVING | IDLE | STEEP UPHILL | STEEP DOWNHILL |
|---|---|---|---|---|---|---|
| ENGINE FAN 302 | -20° | MED.SP | HI SPEED | LOW SPEED | MED HI SPEED | HI SPEED |
| | +40° | " " | " " | " " | " " | " " |
| | +60° | " " | " " | " " | " " | " " |
| | +90° | " " | " " | " " | " " | " " |
| AUXILIARY FAN ON ALL THE TIME EXCEPT HEATER OFF POSITION | | | | | | |
| VEHICLE HEAT EXCHANGE VALVES 316, 318 | -20° | OPEN | OPEN | OPEN | OPEN | OPEN |
| | +40° | OPEN | CYCLING | OPEN | CYCLING | OPEN |
| | +60° | CYCLING | CYCLING | CYCLING | CYCLING | CYCLING |
| | +90° | CLOSED | CLOSED | CLOSED | CLOSED | CLOSED |
| FLAP VALVE 358 | -20° | CLOSED | CLOSED | OPEN | CLOSED | CLOSED |
| | +40° | CLOSED | CYCLING | OPEN | CLOSED | CLOSED |
| | +60° | CYCLING | CYCLING | OPEN | CYCLING | CYCLING |
| | +90° | OPEN | OPEN | OPEN | OPEN | OPEN |
| BOOSTER HEATER 328 | -20° | CYCLING | CYCLING | CYCLING | CYCLING | CYCLING |
| | +40° | CYCLING | OFF | CYCLING | OFF | CYCLING |
| | +60° | OFF | OFF | OFF | OFF | OFF |
| | +90° | OFF | OFF | OFF | OFF | OFF |

F° / C°

INVENTORS
Gordon J. Fairbanks
Vernon N. Tramontini

By William J. Newman
Attorney

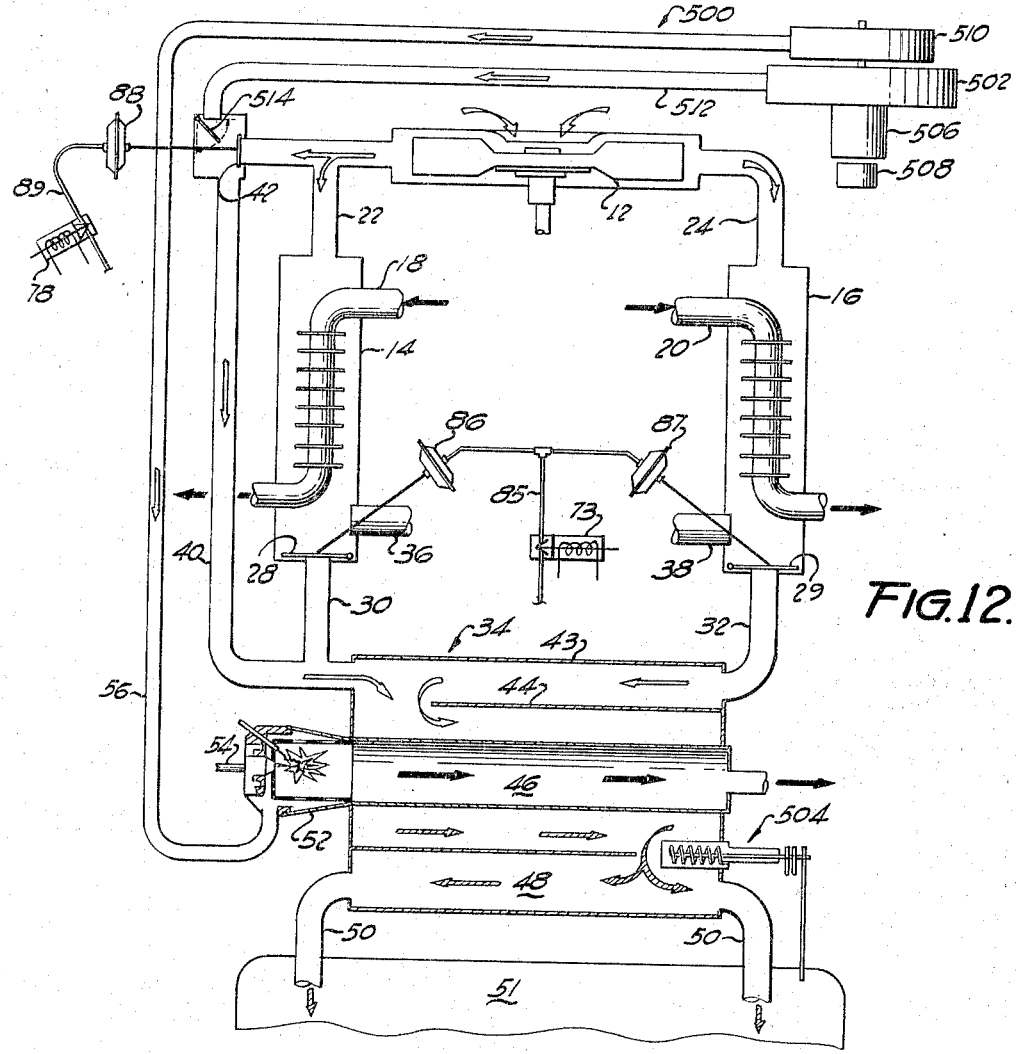

INVENTORS
Gordon J. Fairbanks.
Vernon N. Tramontini

By William J. Newman
Attorney

FIG. 14.

| SYSTEM | PROGRAM CHART FOR HEATER SYSTEM (FIG. 12) | | | | |
|---|---|---|---|---|---|
| | CITY DRIVING | HI-WAY DRIVING | IDLE | STEEP UPHILL | STEEP DOWNHILL |
| ENGINE FAN 12 | −20° MED.SPD-29<br>+40° " " 5<br>+60° " " 16<br>+90° " " 32 | −20° HI SPD.<br>+40° " "<br>+60° " "<br>+90° " " | −20° LOW SPEED<br>+40° " "<br>+60° " "<br>+90° " " | −20° MED.HI SPEED<br>+40° " "<br>+60° " "<br>+90° " " | −20° HI SPEED<br>+40° " "<br>+60° " "<br>+90° " " |
| AUX. FAN. 502 | −20° ON<br>+40° ON<br>+60° CYCLING<br>+90° OFF | −20° ON<br>+40° CYCLING<br>+60° CYCLING<br>+90° OFF | −20° ON<br>+40° ON<br>+60° CYCLING<br>+90° OFF | −20° ON<br>+40° ON<br>+60° CYCLING<br>+90° OFF | −20° ON<br>+40° ON<br>+60° CYCLING<br>+90° OFF |
| VEHICLE HEAT EXCHANGE VALVES 28-29 | −20° OPEN −29<br>+40° OPEN 5<br>+60° CYCLING 16<br>+90° CLOSED 32 | −20° OPEN<br>+40° CYCLING<br>+60° CYCLING<br>+90° CLOSED | −20° OPEN<br>+40° OPEN<br>+60° CYCLING<br>+90° CLOSED | −20° OPEN<br>+40° CYCLING<br>+60 CYCLING<br>+90° CLOSED | −20° OPEN<br>+40° OPEN<br>+60° CYCLING<br>+90° CLOSED |
| BY PASS VALVE 42 | −20° CLOSED−29<br>+40° CLOSED 5<br>+60° CYCLING 16<br>+90° OPEN 32 | −20° CLOSED<br>+40° CYCLING<br>+60° CYCLING<br>+90° OPEN | −20° CLOSED<br>+40° CLOSED<br>+60° CYCLING<br>+90° OPEN | −20° CLOSED<br>+40° CYCLING<br>+60° CYCLING<br>+90° OPEN | −20° CLOSED<br>+40° CLOSED<br>+60° CYCLING<br>+90° OPEN |
| FLAP VALVE 514 | −20° CLOSED−29<br>+40° " 5<br>+60° " 16<br>+90° " 32 | −20° CLOSED<br>+40° "<br>+60° "<br>+90° " | −20° OPEN<br>+40° "<br>+60° "<br>+90° " | −20° CLOSED<br>+40° "<br>+60° "<br>+90° " | −20° CLOSED<br>+40° "<br>+60° "<br>+90° " |
| BOOSTER HEATER 34 | −20° CYCLING−29<br>+40° CYCLING 5<br>+60° OFF 16<br>+90° OFF 32 | −20° CYCLING<br>+40° OFF<br>+60° OFF<br>+90° OFF | −20° CYCLING<br>+40° CYCLING<br>+60° OFF<br>+90° OFF | −20° CYCLING<br>+40° OFF<br>+60° OFF<br>+90° OFF | −20° CYCLING<br>+40° CYCLING<br>+60° OFF<br>+90° OFF |

F° C°

INVENTORS
Gordon J. Fairbanks
Vernon N. Tramontini

By William J. Newnam
Attorney

June 13, 1967  G. J. FAIRBANKS ETAL  3,325,100
VEHICLE HEATING SYSTEM
Filed March 9, 1965  13 Sheets-Sheet 11

INVENTOR
Gordon J. Fairbanks
Vernon N. Tramontini

By William J. Newman
Attorney

INVENTORS
Gordon J. Fairbanks
Vernon N. Tramontini

By William J. Newman
Attorney

June 13, 1967   G. J. FAIRBANKS ETAL   3,325,100
VEHICLE HEATING SYSTEM
Filed March 9, 1965   13 Sheets-Sheet 13
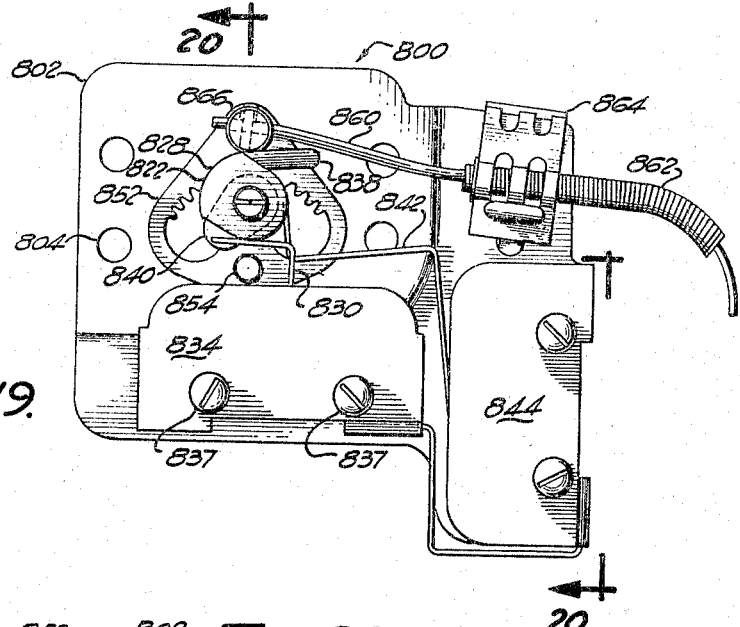
FIG. 19.
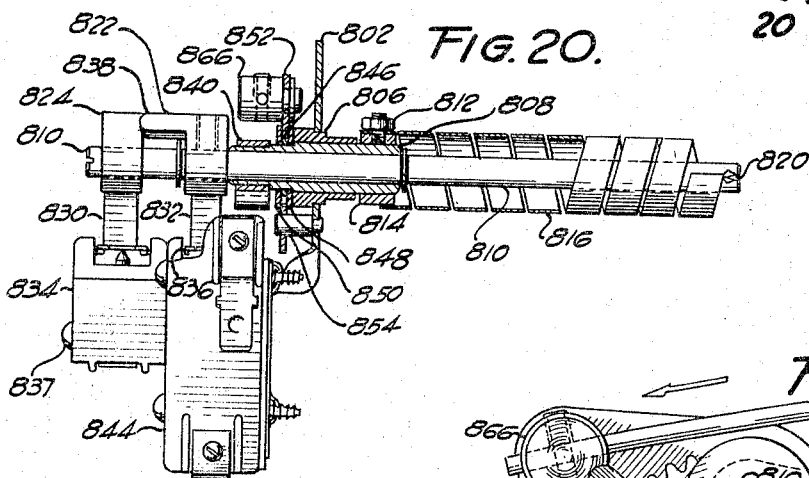
FIG. 20.
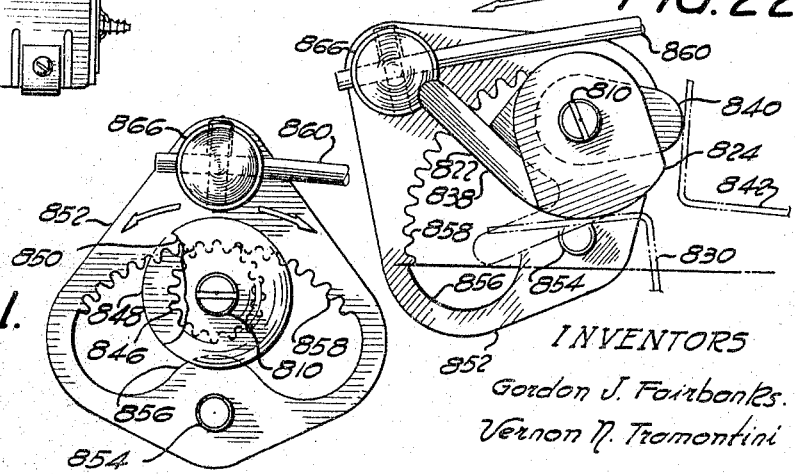
FIG. 22.
FIG. 21.
INVENTORS
Gordon J. Fairbanks.
Vernon N. Tramontini
By William J. Newman
Attorney

United States Patent Office 3,325,100
Patented June 13, 1967

3,325,100
VEHICLE HEATING SYSTEM
Gordon J. Fairbanks and Vernon N. Tramontini, Indianapolis, Ind., assignors to Stewart-Warner Corporation, Chicago, Ill., a corporation of Virginia
Filed Mar. 9, 1965, Ser. No. 438,311
28 Claims. (Cl. 237—2)

ABSTRACT OF THE DISCLOSURE

A heating system for a vehicle cab in which unheated air and air heated by a vehicle engine exhaust heat exchanger is cyclically provided to the system at a ratio determined by manually controllable means for selecting a desired temperature level of air passing to the vehicle cab. The system may also include an auxiliary air blower having a desired volumetric air output to supply air to the system when the volumetric output from the vehicle engine cooling blower is below the desired minimum. A further addition to the system may be a booster heater which is automatically controlled to additionally heat the air if the heat supplied by the engine exhaust heat exchanger is insufficient to maintain the desired temperature level.

---

This application derives from application Ser. No. 389,968, filed Aug. 17, 1964, now abandoned, and the priority date Aug. 17, 1964 is claimed in this application for the subject matter common to that disclosed in the prior application.

This invention relates to heating systems and more particularly to heating systems for heating the cabs of motor vehicles, or the like, having fuel burning engines to provide the motive power. While the teachings of this invention are applicable to heating systems for most types of motor driven transportation apparatus the following description is directed primarily to road driven vehicles such as automobiles, trucks, buses and the like.

Many heating systems used in present day vehicles are inadequate to meet the many varied weather and driving conditions a motorist is likely to encounter. The problems are particularly difficult in temperate and cold zones of the world, especially when the vehicles are to be used under varying driving conditions such as city, open country and mountain driving. Each of these conditions set forth requirements which must be taken into account in the design of a motor vehicle heating system for full satisfaction of user comfort.

Most, if not all, vehicle heaters utilize heat generated by the vehicle engine in the cab heater system. In liquid cooled engine vehicles the heat for the cab heater is taken from the liquid coolant. In air cooled engine vehicles the heat is generally taken from air which is circulated about the engine and/or from the engine exhaust. Engine load is thus a determinative condition of the heat available for the cab heating system and this of course is determined among other things by road conditions. For example, in open highway driving or extended uphill driving, plenty of heat is usually generated to satisfy the vehicle cab demands. However, stop and go city driving or extended downhill driving provides less of a load on the engine, and sufficient heat may not be available to satisfy cold weather heat demands.

Additional problems are encountered because of varying weather and driving conditions with air cooled engine vehicle systems. For example, in some vehicles the air for the cab heater system is provided by the engine cooling air blower. Since this blower is usually driven directly by the engine its speed varies with the speed of the engine. City driving conditions with slower speeds and stop and go requirements cause an insufficient volume of heated air to be supplied to the vehicle cab to maintain comfortable temperature levels at all times.

Some of the present day vehicle heating systems have no facilities for providing unheated air to the vehicle for warm weather ventilating or windshield defogging. This is especially true with some of the air-cooled engine European vehicles which are very popular in the world markets. In these vehicles ventilation and defogging can be accomplished only by opening the vehicle windows (undesirable in inclement weather) or, by turning on the heating system to provide heated air.

Another problem found in heating systems of vehicles today is that they are difficult to adjust to maintain a desired comfortable temperature without constant manipulation of the controls. They usually have a number of controls and control settings which an operator must select for optimum comfort. For example, many automobile heating systems have a hot air temperature control selector, a cold air control, and an air blower on-off speed selector control. Constant manipulation of the several selector controls is required to adjust for the different weather and driving conditions encountered during the day's driving. It is not only bothersome for an operator to constantly change control settings but is also hazardous, taking him away from his primary duty of driving the vehicle.

It is therefore an object of this invention to provide vehicle heating systems which are flexible enough in operation to meet substantially all weather and driving conditions.

It is also an object of this invention to provide flexible vehicle heater systems which are easily adjustable to a desired comfort level setting and require a minimum of subsequent adjustment to maintain the desired comfort level.

Another object of this invention is to provide improvements to existing adequate vehicle heating systems to give them added flexibility and make them easier to control.

A further object of this invention is to provide heating systems and improvements for existing systems which are inexpensive to operate while being economical to fabricate and maintain.

Another object of this invention is to provide a combined control switch and temperature selective thermostat to be used in the heating systems of this invention.

Other objects and advantages of this invention will become apparent upon a further reading of this specification especially when taken in view of the accompanying drawings in which:

FIG. 1 is a diagrammatic illustration of one embodiment of a heating system employing the principles of the present invention which includes a vehicle engine heat exchanger and a booster heater;

FIG. 2 is a circuit diagram illustrating one manner of operating the components of the system illustrated in FIG. 1;

FIG. 3 is a graph indicating the manner in which the heating system is cycled to achieve a desired output temperature level;

FIG. 4 is a chart indicating the operational status of each of the major components of the system of FIG. 1 under different driving and weather conditions;

FIG. 11 is a chart indicating the operational status of each of the major system components of the system of FIG. 9 during different weather and driving conditions;

FIG. 12 is a diagrammatic illustration of a second preferred embodiment of a heater system employing the teachings of this invention;

FIG. 14 is a chart indicating the operational status of the major components of the system of FIG. 12 during different weather and driving conditions;

FIG. 19 is an elevation view of a thermostatic switch assembly for use in the systems to be described;

FIG. 20 is a partial section view of the thermostatic switch assembly taken along the section lines 20—20 of FIG. 19;

FIG. 21 is an enlarged elevation of an operating adjustment lever switch shown in FIGS. 19 and 20; and FIG. 22 is an enlarged view of the operating adjustment lever and cams adjuster thereby for selecting the desired heating system output.

Figure 5:
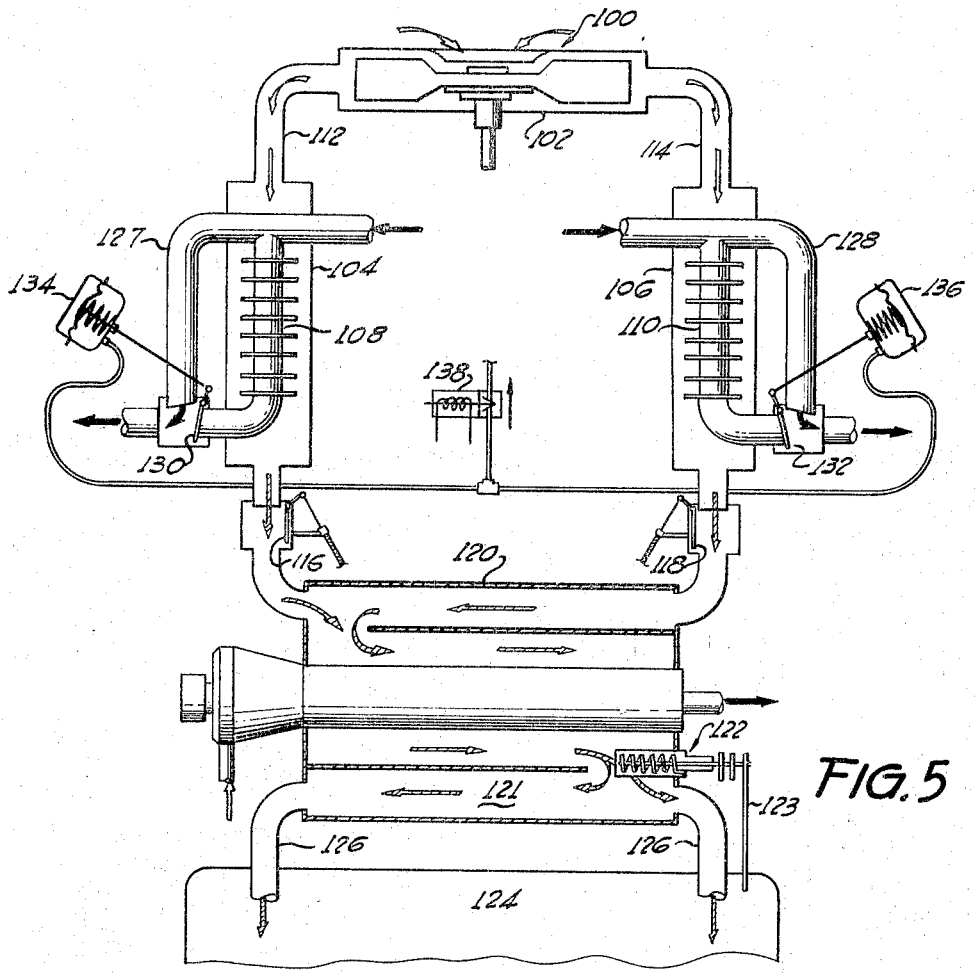
FIG. 5 is a diagrammatic illustration of another embodiment of a heating system employing the principles of the present invention which also includes a vehicle engine heat exchanger and a booster heater.

Briefly a heating system for the cab of a vehicle embodying the teachings of this invention comprises an air blower, an air passage between the blower and the vehicle cab, and a heat exchanger for transferring heat generated by the vehicle engine to the air passing to the vehicle cab. Means are also provided for preventing the heat exchanger from heating the air passing to the vehicle cab and temperature responsive means for actuating and de-actuating the heat exchanger preventing means so as to modulate the temperature of the air passing to the cab about a desired temperature. In addition the system may include an auxiliary air blower having a desired volumetric air flow output to supply air to the system when the volumetric flow output of the main blower is below the desired minimum. A further addition to the system may be a booster heater which is automatically controlled to additionally heat the air if the heat supplied by the engine heat exchanger is insufficient to maintain the desired temperature level.

*Description of FIG. 1 embodiment*

FIG. 1 shows the first embodiment of a heating system employing the principles of the present invention and the system 10 includes a blower 12 with heat exchangers 14 and 16. The heat exchangers 14 and 16 utilize the hot exhaust gases from the vehicle engine (not shown), the gases passing through conduits 18 and 20 to heat air supplied by the blower to the heat exchangers through air passage conduits 22, 24, respectively.

The blower 12 may be driven directly from the engine and may actually be the blower for supplying the engine coolant air. In such case the air output is directly governed by the speed of the engine. Alternatively, the blower 12 may be driven by a separate electrical motor or driven by the engine through a constant speed coupling device so that the air flow output thereof does not vary appreciably with the speed of the vehicle engine. It is of course preferable that the blower be driven at a substantially constant speed so that sufficient air is provided through the heater system even when the vehicle is driving at slow speeds or is idling at a traffic signal.

The air in conduits 22 and 24, after being warmed by the heat exchangers 14 and 16, is directed by vehicle engine heat exchanger valves 28, 29, respectively, through respective air passage conduits 30 and 32 to a booster heater 34 or through respective outlets 36, 38 to atmosphere. The valves 28, 29 normally close the passage of air from the heat exchangers to the booster heater 34. An unheated air bypass is provided around the heat exchangers 14, 16 through air passage conduit 40 which is controlled by a normally closed valve 42. Thus, when the system is turned off no air passes therethrough to the vehicle cab.

The booster heater 34 may be of the type disclosed in application Ser. No. 343,606, filed Feb. 10, 1964, now Patent 3,273,799 issued Sept. 20, 1966, by Gordon J. Fairbanks, one of the present co-inventors, and Kurt Staiger. The booster heater 34 comprises a housing 43 with baffles 44 to define an air passage therethrough past a heat exchanger 46 into an outlet plenum 48. Air distribution passages 50 transport the air to the vehicle cab 51 where it is distributed in a conventional manner.

The booster heater has a burner 52 the combustion gases of which pass through heat exchanger 46 on their way to exhaust 57 to transfer heat to the air. Fuel is supplied to the burner 52 through fuel line 54 from a fuel pump (not shown) and air is supplied thereto through conduit 56 which may be connected to the blower 12 or to an additional air souce.

An adjustable helical bimetal sensing device 58 such as described in detail with respect to FIGS. 19 through 22 is disposed in the outlet plenum 48 of the booster heater for sensing the temperature of the air. It controls the operation of the system 10 in accordance with the adjusted temperature setting and the temperature of the air passing thereby. Briefly, the thermostatic sensing device 58 comprises a helical bimetal element 59 which is adapted to rotate a shaft upon which are located a series of cams for example 60, 62 and 64 shown in FIG. 2. The cams operate respective switches 66, 68 and 70 in a desired sequence responsive to the temperature sensed by the bimetal 59. The temperatures at which the switches are operated are manually selectable by rotating the bimetal with a push-pull cable 72 such as a Bowden wire or the like. The bimetal may of course be controlled in any other manner desired from within the cabin, and other suitable temperature sensing devices may be substituted for the bimetal assembly 58 either in the vehicle cabin or at the booster heater outlet plenum 48. The cams 60 and 62 are positioned with respect to each other such that switch 66 is opened whenever switch 68 is closed and vice versa. Cam 64 is positioned such that switch 70 closes only after switch 66 is closed by cam 60.

Switch 66 controls a solenoid valve 73 through a conventional ignition switch 74 and a main heater control switch 76 to power supply 75. The solenoid valve 73 controls the operation of valves 28 and 29 which alternatively cause the heated air passing through the heat exchanger to be passed to the booster heater 34 or to atmosphere through outlets 36, 38. The solenoid valve 73 controls a vacuum line 85 from the engine intake manifold to vacuum actuators 86, 87. As may be seen in FIG. 1 the solenoid valve 73 in its normally closed condition blocks the vacuum line 85 so that actuators 86 and 87 cause the air passages 30, 32 to the booster heater 34 to be closed. When the circuit to the solenoid valve 73 is completed through switch 66 the vacuum line 85 is opened and actuators 86, 87 pull the respective valves 28, 29 to open the air passages 30, 32 to booster heater 34 and close the atmosphere dump outlets 36, 38 respectively.

Switch 68 controls a solenoid valve 78 through switches 74, 76 to the power supply 75. Normally closed solenoid valve 78 controls the operation of air bypass valve 42 through vacuum actuator 88. In the normally deenergized condition of solenoid valve 78 a vacuum line 89 leading from the engine intake manifold to actuator 88 is closed so that valve 42 closes the air bypass conduit 40. However, when switch 68 is closed actuator 88 is subjected to the intake manifold vacuum and valve 42 is opened.

The switch 70 controls a circuit from the vehicle ignition switch 74 and main control switch 76 to a fuel valve solenoid 80 and to an ignition coil 82 through breaker contacts 84. The solenoid valve 80 controls the supply of fuel to the booster heater burner 52 while the ignition coil 82 and contacts 84 serve to supply the igniting sparks for the burner 52. The main heater control switch 76, when operated in series with the ignition switch 74, serves to immediately actuate the blower 12 if it is driven by an electric motor such as indicated at 77. If another type of drive is used for the blower 12 it is either under constant operation if the engine is running or the drive is placed under control of an appropriate electrical device which is operated in place of motor 77 on the closure of switches 74 and 76.

The switch 66 is normally open when the temperature at the thermostat 58 is above a desired temperature level as set by adjustment of cam 60 under control of cable 72. Under this condition switch 68 is maintained closed by cam 62 so that the air heated by the heat exchangers 14 and 16 is blocked from the booster heater 34 and cool air is provided thereto through the open valve 42 and bypass conduit 40. When the thermostat 58 senses a temperature below the desired level, cam 60 rotating in the direction of arrow 90 will cause switch 66 to close and switch 68 to open so that vehicle engine heated air will be supplied to the booster heater through valves 28, 29 and the bypass air will be blocked at valve 42. If the vehicle engine heat exchangers are adequate to satisfy the heat demand called for by thermostat 58 the cams are then rotated in the opposite direction as indicated by arrow 92 until switch 66 is again opened and switch 68 closed to block the heated air and provide cool bypass air to the booster heater 34. The temperature at thermostat 58 again begins to drop causing the cams to again reverse their rotation in the direction of arrow 92. Thus, the air temperature at the thermostat 58 is temperature modulated about the desired temperature level as indicated by portion A of the graph shown in FIG. 3. The overshoot above and below the desired minimum is caused by the inertia of the system due to the heat content of the various system components.

If for some reason the heat exchangers 14, 16 can not supply the desired temperature level such as extremely cold ambient temperatures or the vehicle is descending along an extended decline reducing the engine load and the heat generated thereby, the bimetal 59 will cause the cams 60, 62, 64 to continue rotating in the direction of arrow 90 until switch 70 is closed along with switch 66. This is represented by portion B of the graph in FIG. 3. Fuel valve solenoid 80 is then energized and the circuit to ignition coil 82 and breaker points 84 is closed to actuate the burner 52 in the booster heater 34 to provide additional heat to the air passing therethrough. The heat added by the booster heater 34 causes the bimetal 59 to rotate cams 60, 62, 64 in the direction of arrow 92 so that switch 70 again opens to cut the booster heater burner 52. If the vehicle heat exchanger still cannot satisfy the heat demand the cam 64 and switch 70 will cause the booster heater 34 to turn on and off and modulate the air temperature at the thermostat 58 about the new temperature level which is slightly below the desired temperature level. This condition is indicated by portion C of the graph in FIG. 3.

Thus, the system ordinarily operates to satisfy a desired temperature condition by cycling the heated air from the vehicle engine heat exchangers with unheated air from the bypass 40. The temperature of the air passing the thermostat 58 is modulated above and below the desired temperature level but these slight variations are not readily perceptible by a passenger in the vehicle cab 51. If the vehicle engine heat exchangers 14, 16 are incapable of satisfying the heat demand required by the desired temperature, the booster heater 34 is brought into operation and caused to cyclically ignite and extinguish to modulate the temperature of the air about a temperature slightly below the desired temperature level.

The system is also capable of supplying unheated air to the vehicle compartment 51 if desired for defogging the windows or for ventilating during the warmer seasons of the year. That is, the cams may be rotated manually in the direction of arrow 92 to a position at which it would take a very low air temperature to rotate the cams in the opposite direction far enough to close switch 66 and open switch 68. If the ignition switch 74 and the heater control switch 76 are actuated the circuit is closed to the air bypass valve solenoid 78 through switch 68 opening air bypass valve 42 to provide a path for cool air from the blower 20 through the air bypass 40 and the non-operating booster heater 34 to the vehicle cab. Unheated air is thus provided for defogging or ventilating the vehicle cab. This is a feature which is not available on at least one of the European make automobiles now on the market.

It is to be noted that if the blower 12 is driven by a separate electric motor such as shown at 77 in FIG. 2, the heater system may be operated independently of the vehicle engine. If the switches 74 and 76 are closed motor 77 is energized to provide air to the vehicle cab. Rotation of the cams to a position at which switch 70 is closed causes the booster heater burner to operate to provide heat for the air passing to the vehicle cab. Thus, the vehicle cab heat may be maintained even when the engine is not running.

The chart shown in FIG. 4 gives a clear picture of the operation of the system of FIG. 1 by indicating the status of the major controlling components of the system during various driving and temperature conditions. For example, when the ambient temperature is −20° F. (−29° C.) the engine heat exchanger valves 28, 29 are opened to provide heated air to pass to the booster heater 34 during all driving conditions including city driving, highway driving, idling at a traffic signal, steep uphill driving or steep downhill. Since the bypass valve 42 operates alternatively with the engine heat exchanger valves 28, 29 it will be closed during all driving conditions at −20° F. (−29° C.). The booster heater at −20° F. (−29° C.) will be cycling on and off to add heat to the engine heat exchanger heated air to satisfy the heat demand of thermostat 58.

At 40° F. (5° C.) the engine heat exchangers 14, 16 may again not be adequate to satisfy the heat demand for the desired temperature level during city driving so that the engine heat exchanger valves 28 and 29 are open with bypass valve 42 closed. The booster heater burner is again cycling to satisfy the heat demand. At idling speeds the booster heater will be operating as well as during extended steep downhill driving. At higher speeds during highway driving or steep uphill driving, however, the engine heat exchangers are capable of supplying the heat demand so that the heat exchanger valves 28, 29 and the bypass valve 42 are cycling while the booster heater burner is maintained in its extinguished condition.

At 60° F. (16° C.) the engine heat exchangers 14, 16 are capable of handling the heat demand under all driving conditions, and the booster heater is not operated at all. At 90° F. (32° C.) there will probably be no heat demand so that the bypass valve 42 is constantly open to provide ventilating air to the vehicle cab. It is to be recognized that the particular status of the components for each of the driving and temperature conditions shown in the chart are not necessarily fixed. The status is dependent upon the temperature that the vehicle operator may desire, and this, of course, can vary greatly with different operators. For example, one operator may desire that the vehicle cab be maintained at a temperature of 65° during winter driving while another operator may desire a cabin temperature of 80°.

*Description of FIG. 5 embodiment*

FIG. 5 shows a modification of the heating system shown in FIG. 1 and is indicated by the reference character 100. The system 100 is similar to system 10 differing only in the means for cycling the engine heat exchangers to modulate the temperature of the air passing to the booster heater. The system 100 comprises a blower 102 which may be the vehicle engine fan but preferably is a constant flow rate type. Air from the blower 102 passes to heat exchangers 104, 106 through air passage conduits 112, 114. The air passing through the heat exchangers 104, 106 is heated by the transfer of heat thereto from hot exhaust gases of the engine passing through conduits 108, 110.

The air passes from vehicle engine heat exchangers 104, 106 through respective shutoff valves 116, 118 to the booster heater 120. The booster heater 120 is substantially the same as booster heater 34 in FIG. 1 and has a thermostat 122 in the booster heater outlet plenum 121. The setting of thermostat 122 is controlled by a cable 123 and air passing the thermostat 122 is carried into the cabin 124 of the vehicle by means of air distribution passages 126.

Alternate conduits 127, 128 are provided for the vehicle engine exhaust gases with respective control valves 130, 132 to control the flow of exhaust gases through the heat exchanger conduits 108, 110 or the bypass exhaust conduits 127, 128. When the valves 130, 132 are in their normal deactuated condition they block the flow of exhaust gases to the exchanger conduits 108, 110 and open the flow path through the bypass conduits 127, 128. Thus, air streams passing through the heat exchangers 104, 106 from the blower 102 are not heated as they pass therethrough. When a heat demand is required to be satisfied valves 130, 132 are operated to their alternative position at which the exhaust gas bypass conduits 127, 128 are closed and the conduits 108, 110 to the heat exchangers 104, 106 are opened so that heat is transferred to the air passing therethrough. The valves 130, 132 are operated by vacuum actuators 134, 136 respectively, which are operated by the vacuum at the engine intake manifold, the connection thereto being controlled by normally closed solenoid valve 138. Valves 116, 118 enable the operator to close the air passages to prevent ventilating air from reaching the vehicle cab 124 if desired These valves might be separately operated or may be linked to the cable 123 to be opened whenever the thermostat 122 is adjusted away from its off or home position.

Figure 6:
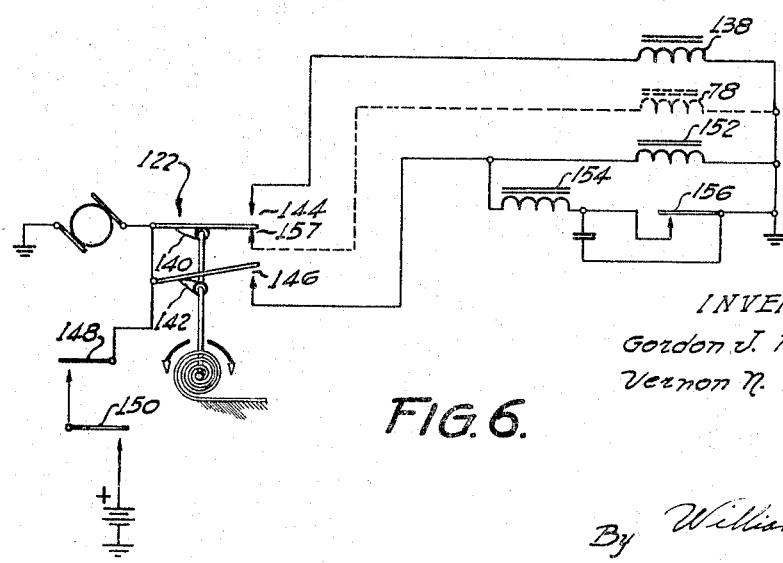
FIG. 6 is a schematic diagram of a circuit for use in operating the system of FIG. 5.

The circuit for actuating the components of FIG. 5 is quite similar to that of the FIG. 1 system except of course additional means for acuating a bypass air valve are not required. The circuit for the system of FIG. 5 is shown in FIG. 6 with different types of cams 140, 142 used for actuating the switches 144, 146. Switch 144 controls the actuation of the solenoid valve 138, for the exhaust valves 130, 132, through an obvious circuit including thermostate switch 144, a vehicle ignition switch 150 and main heater control switch 148 to the power supply. Switch 146 controls the actuation of the fuel solenoid valve 152, the ignition coil 154 and ignition breaker points 156 for the burner of the heat exchanger 120. It is to be noted that a thermostat using these type of cams 140, 142 may be used in the system of FIGS. 1 and 2 merely by adding a normally closed contact 157 to the switch 144 to control the bypass solenoid 78.

This system works essentially the same as the previously described system with the exhaust gas valves 130, 132 being cycled by cam 140 and switch 144 to modulate the air temperature about the desired level. If the heat exchangers 104, 106 are inadequate to satisfy the heat demand as called for by thermostat 122 the exhaust gas passages 108, 110 through the heat exchangers 104, 106 are maintained open and the booster heater 120 is actuated to supply the additional required heat. Cam 142 and switch 146 control the actuation and deactuation of the booster heater to cause the temperature of the air passing thermostat 122 to be modulated about the slightly lower temperature as hereinbefore described for the system of FIGS. 1 and 2.

Since this system operates the same as that for FIGS. 1 and 2 a program chart such as shown in FIG. 4 is not included. A chart for this system would be essentially the same as that of FIG. 4 except that the vehicle heat exchange valves 28, 29 and bypass valve 42 are replaced by the exhaust gas valves 130, 132. Therefore, the status of the closure of vehicle heat exchange valves 28, 29 would be the same as the status of the closure of heat exchanger gas exhaust conduits 108, 110 and the status of the closure of bypass valve 42 would be the same as the status of the closure of bypass gas exhaust conduit 127, 128.

Figure 7:
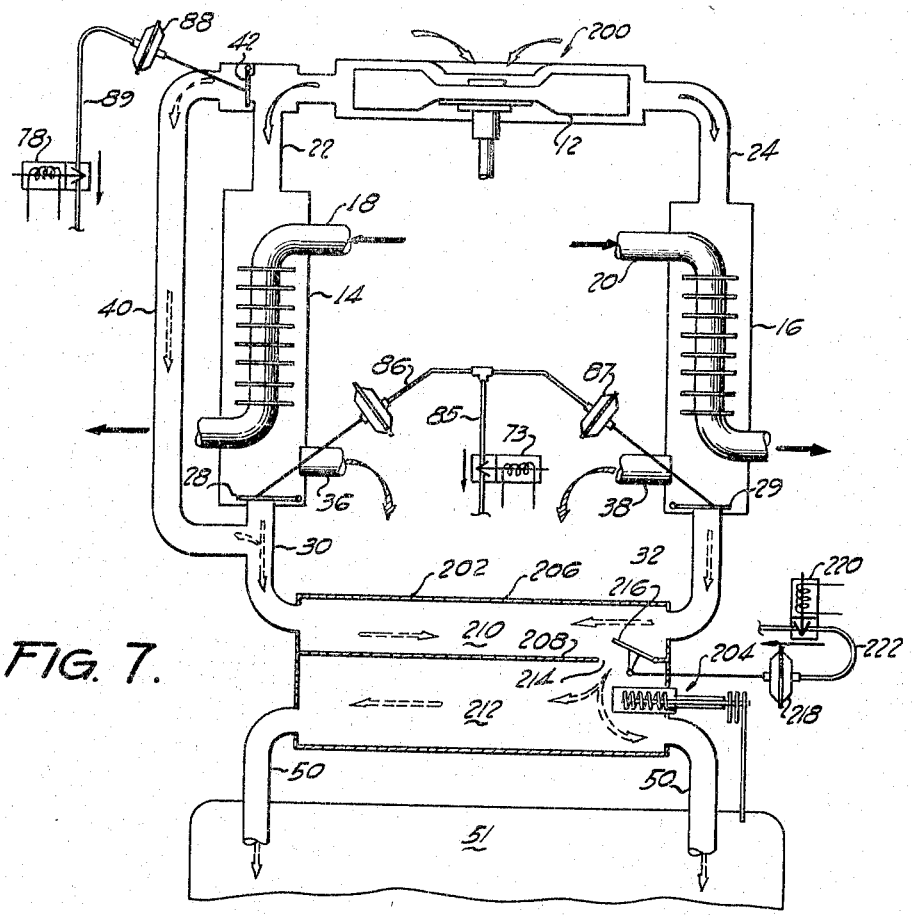
FIG. 7 is a diagrammatic illustration of a heater system in which the booster heater is replaced by an air mixer plenum chamber.

*Description of FIG. 7 embodiment*

The system 200 of FIG. 7 is also similar to the system 10 of FIG. 1 except that an air mixer plenum chamber assembly 202 replaces the booster heater 34. Since the vehicle heat exchanger portion of the system is identical to that of FIG. 1, like parts are given the same reference number and a detailed description is unnecessary. Other parts of the system which are the same as FIG. 1 are also given like reference numbers.

The system 200 is designed for use in more moderate temperature zones of the world such as the southern portions of the United States and locations around the Mediterranean Sea in which the vehicle engine heat exchangers 14, 16 would always be able to satisfy the heat demand.

The plenum chamber assembly 202 does not include a burner but is used merely to mix the air coming from the two vehicle engine heat exchangers 14, 16 or the cool air bypass 40 before it is passed over the thermostat 204. The assembly 202 comprises a housing 206 with appropriate baffle means 208 to form an inlet air mixer plenum 210 in communication with the air passages 30, 32 and an outlet plenum 212 in communication with the air distribution passages 50. A port 214 is provided between the inlet and outlet plenums in which a restrictor valve 216 is actuatable to restrict the flow of air to the vehicle cab 51. The restrictor valve 216 is operated by a vacuum actuator 218 which is controlled by a normally closed solenoid valve 220 in the vacuum line 222 between the actuator 218 and the engine intake manifold.

The restrictor valve 216 is provided to take care of the situation when the vehicle is traversing a long downhill stretch of road where the engine is under light load and sufficient heat is not provided to the heat exchangers 14, 16 to warm the large volume of air forced by the blower 12. This is an uncomfortable condition to occupants of the vehicle cab 51 because cool air is actually being dispensed into the cab. This, of course, was no problem in the systems of FIG. 1 and FIG. 5 because the booster heater was present to warm this cool air. The restrictor valve 216 serves this purpose by slowing the air flow rate through the heat exchangers 14, 16. It is true that less air passes to the vehicle cab 51, but the air that does pass therethrough is warmer due to its lower flow rate.

Figure 8:
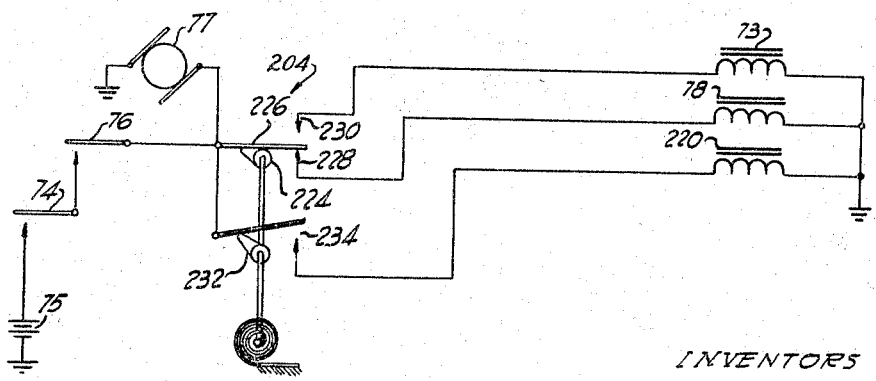
FIG. 8 is a schematic diagram of an electric circuit for operating the system of FIG. 7.

The circuit shown in FIG. 8 for the system of FIG. 7 is similar to those of FIG. 2 or FIG. 6. In the heater off condition each of the solenoids 73, 78 and 220 are deenergized so that the air passages through the heat exchangers 14, 16 and bypass 40 are closed, and the restrictor valve 216 is opened. Cam 224 actuates switch arm 226 to cyclically engage normally closed contacts 228 and normally open contacts 230 to modulate the temperature of the air passing the thermostat 204 about the desired temperature level. If the heat exchangers 14, 16 are insufficient to supply the heat demand, such as during the long downhill run, cam 224 and cam 232 are rotated further in the counterclockwise direction to close switch 234 completing the circuit to the restrictor valve solenoid 220. When the engine again begins generating sufficient heat to satisfy the demand the cams rotate in the clockwise direction opening the restrictor valve 216 and cycling the vehicle heat exchanger portion of the system to modulate the air temperature about the desired temperature level.

Figure 9:
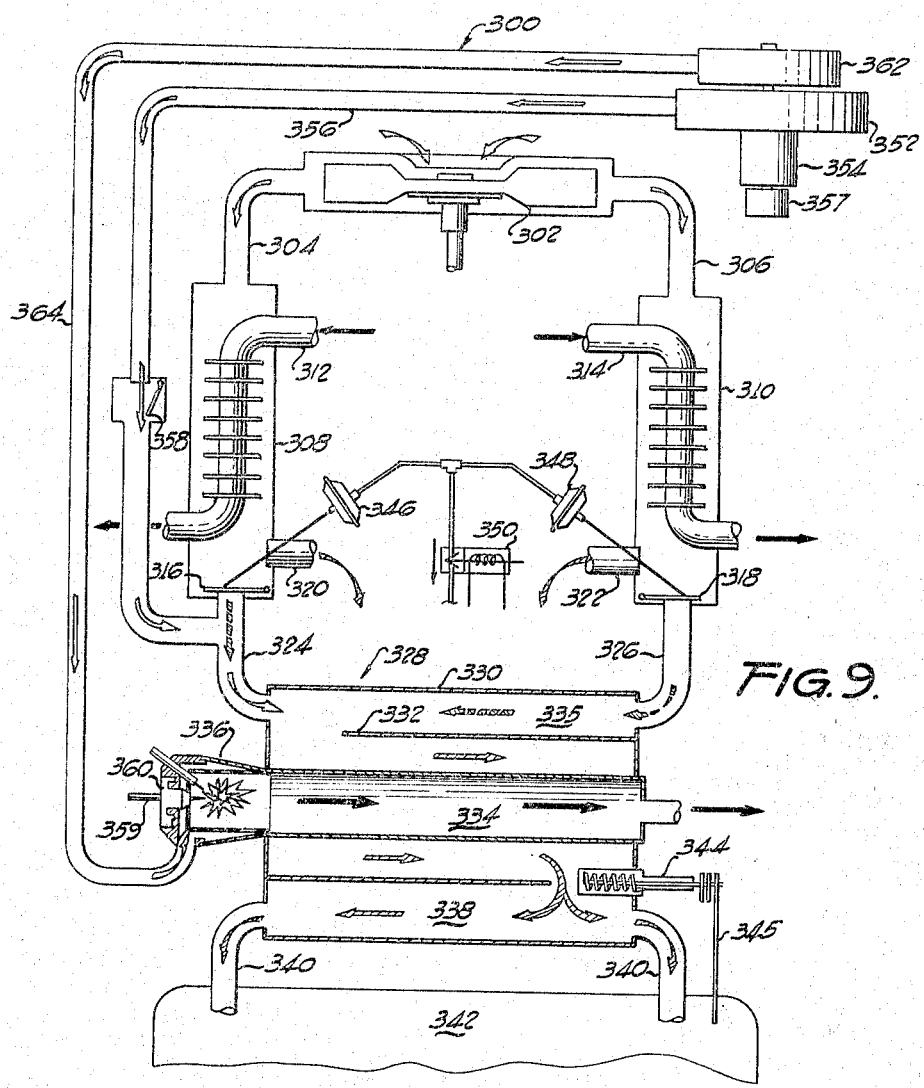
FIG. 9 is a diagrammatic representation of one preferred embodiment of a heating system employing the principles of the present invention.

*Description of FIG. 9 embodiment*

The systems hereinbefore described will provide sufficient volumetric air flow under all driving conditions only if the blower 12 and 102 are of the constant speed type. If, however, the engine driven blower is used to provide the air there will be insufficient volumetric flow at low speeds or idling speeds. It would of course be advantageous from a cost standpoint to utilize the engine air blower whenever possible and still provide sufficient air at the low speeds and this is accomplished in the systems to be hereinafter described.

Reference is now made to the system 300 as shown in FIG. 9 of the drawings. While some of the components of this system are similar to those in the previously described systems a complete description will be given with new reference numbers applied throughout. The blower 302 in this system is that provided in the vehicle for cooling the engine and driven thereby. Thus, its volumetric air flow output varies as the speed of the vehicle engine as hereinbefore mentioned. The air from the blower 302 is transported through passages 304, 306 to heat exchanges 308, 310. As the air passes through the heat exchangers 308, 310 heat is transferred thereto from the exhaust gases passing through conduits 312, 314.

Heat exchanger valves 316, 318 determine the flow of the heated air passing through the heat exchanger which is either dumped to atmosphere through outlets 320, 322 or passed to air passages 324, 326 leading to the booster heater 328. The booster heater 328 may be of the type as shown in the aforementioned application No. 389,968 which includes a housing 330 and baffle means 332 forming an air passage past a heat exchanger 334 through which combustion gases from a burner 336 flow. The outlet plenum 338 of the booster heater is connected by air distribution passages 340 to the vehicle cab 342. A thermostat control assembly 344 is provided in the outlet plenum 338 of the booster heater but may be located elsewhere beyond the booster heater 328 as described for the previous systems. It is manually adjustable by means 345 such as a Bowden wire.

An auxiliary air blower 352 is provided which is driven by its own electrical motor 354. The output of the auxiliary blower is connected to the air passage 324 by means of air passage conduit 356 in which there is located a flap valve 358. Flap valve 358 operates responsive to a pressure differential between the air on either side thereof. It is therefore closed to shut the conduit 356 when sufficient air is provided by engine blower 302, but is open when the volumetric flow rate of engine blower 302 is below a desired minimum as determined by the output of the auxiliary blower 352.

The motor 354 driving the auxiliary blower 352 also drives a fuel pump 357 for supplying fuel to the booster heater burner 336 through conduit 359 incompletely shown leading to fuel injector nozzle 360 in the burner 336. The motor 354 also drives an additional blower 362 for forcing combustion air through conduit 364 to the booster heater burner 336.

Figure 10:
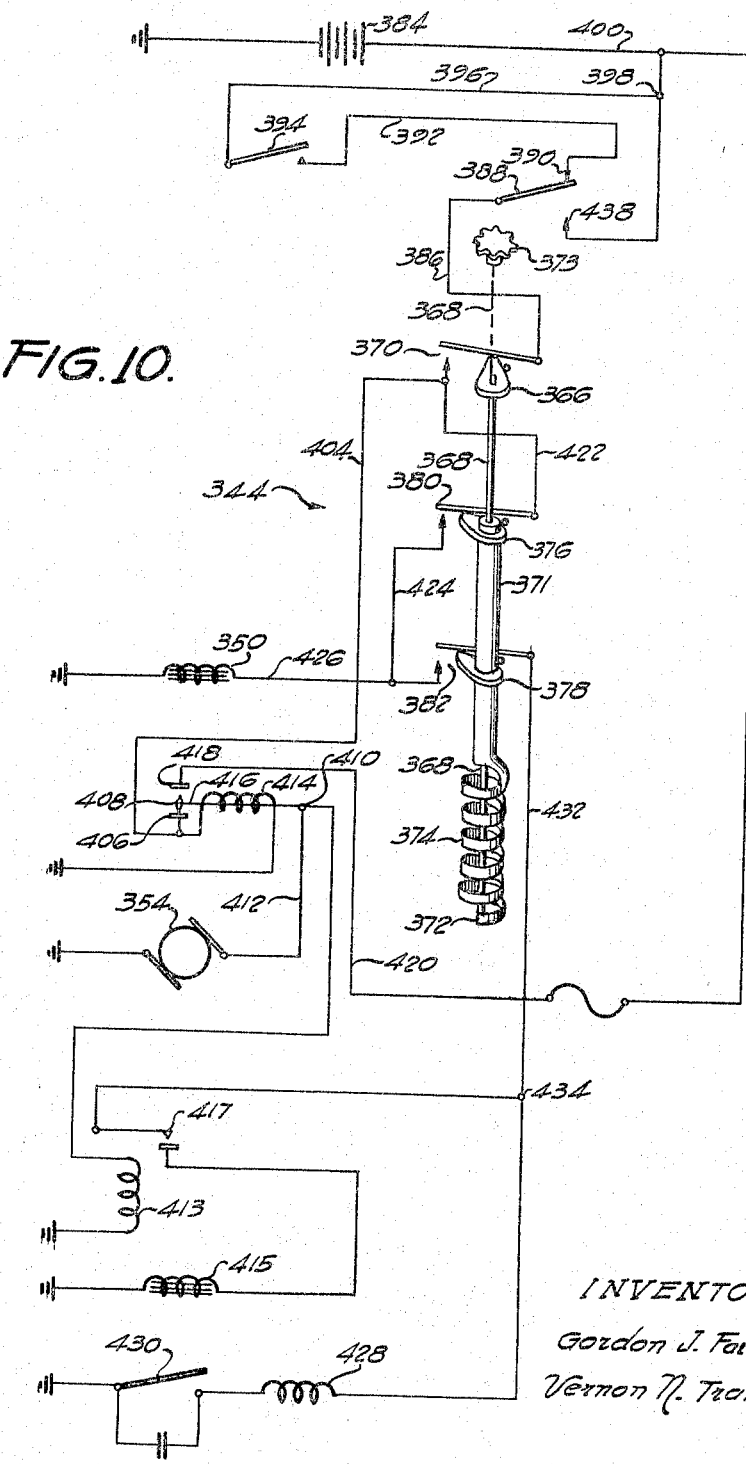
FIG. 10 is a schematic diagram of a circuit for controlling the system of FIG. 9.

FIG. 10 shows a circuit for operating the system of FIG. 9 and includes a number of additional features which will be hereinafter described. The thermostat control assembly 344 shown therein in schematic representation is preferably but not necessarily an assembly such as will be hereinafter described with FIGS. 19 through 22. It comprises a first cam 366 fixed to a shaft 368 which is directly manipulatable by a hand-operated means such as knob 373. The cam 366 controls the operation of a switch 370 in the circuit for initiating operation of the heater system as hereinafter described. The shaft 368 extends through a sleeve 371 which is rotatable with respect thereto and is fixed at 372 to the end of helical bimetal 374. The other end of the bimetal 374 is fixed to the sleeve 371 which carries cams 376 and 378. Cam 376 operates switch 380 which controls the cyclic operation of the vehicle engine heat exchanger 308, 310 in a manner to be hereinafter described. Cam 378 controls a switch 382 which in turn controls the cyclic operation of the booster heater 328 in the manner to be hereinafter described.

In the heater system off position of the thermostat control assembly 344 which is the position shown in FIG. 10, the cam 366 holds switch 370 open to break the circuit leading to the battery 384 which includes conductor 386, timer switch arm 388, normally closed contact 390, conductor 392, vehicle ignition switch 394, conductor 396, junction 398 and conductor 400. When the knob 373 is manipulated to turn the system on switch 370 is closed by cam 366 as it leaves the home position completing a circuit to the auxiliary blower motor 354 to a circuit from switch 370 including conductor 404, normally closed contacts 406 of a time delay switch 408, time delay bimetal switch arm 416, junction 410 and conductor 412. The heater winding 414 of the time delay switch 408 is also energized through an obvious circuit from contacts 406 to ground. Fuel solenoid valve 415 is also prepared for operation by actuation of relay 413 connected to junction 410. After a prescribed time delay the switch arm 416 of the time delay relay 408 engages contact 418 to close a direct circuit between the motor 354 and the battery 384 through conductor 420. The blower motor 354 is therefore on continuously during the operation of the heater system. The purpose of the time delay switch 408 is to maintain the blower motor 354 energized for a short time after the system is turned off so that the air from the additional blower 362 purges the burner 336 of the booster heater 328.

Manipulation of the knob 373 further in a counterclockwise direction towards a desired temperature setting closes switch 380 to complete a circuit to the vehicle heat exchanger solenoid valve 350 through the circuit from switch 370 including conductor 422, switch 380, conductor 424 and conductor 426. The actuation of solenoid 350 provides a vacuum to the vacuum actuators 346, 348 causing valves 316, 318 to open the passages 324, 326 from the vehicle heat exchangers 308, 310 to the booster heater 328. Heat exchanger heated air passes therethrough past the thermostat 344 and through passages 340 to the vehicle cab 342. If the heat supplied by the vehicle engine heat exchangers 308, 310 is sufficient to satisfy the heat demand the bimetal 374 will rotate the sleeve 371 in a clockwise direction to open the switch 380 and release heat exchanger solenoid valve 350. Since the closure of valves 316, 318 reduces the air pressure in passage 324 flap valve 358 will open to admit unheated air from the auxiliary air blower 352. Thus, the vehicle heat exchangers 308, 310 are cyclically actuated and deactuated and the temperature of the air passing the thermostat 344 is modulated about the desired temperature level.

If the knob 373 is manipulated in a counterclockwise direction to a further point, switch 382 will be closed by cam 378 so that a circuit will be completed to the ignition coil 428 and breaker points 430 through the circuit from switch 370 including conductor 422, switch 380, conductor 424, switch 382, conductor 432, junction 434 and conductor 436. The closure of switch 382 also actuates fuel solenoid valve 415 which was previously prepared by the closure of contacts 417 of relay 413.

The fuel solenoid valve preparing relay 413 is provided to make sure that the fuel solenoid valve is closed whenever the motor 354 which drives the fuel pump is deenergized. If, for some reason the motor is deenergized such as a malfunction of the time delay switch 408, but the system is turned on, it is desirable that no fuel flow to the booster heater burner. Even though the fuel pump is not operating fuel could flow from the vehicle tank to the burner by gravity flow if the vehicle is on a hill. The fuel puddling which might occur in the burner could cause a backfire the next time the burner is ignited and is avoided by this means.

This system is also capable of providing heated air to the vehicle cab even while the vehicle engine is not running. With the heater system actuated by the closure of switch 370, air is provided by the auxiliary blower 352 through passage 356 to the booster heater 328. Assuming that the control knob 373 is actuated to a heat demand position at which cam 378 closes switch 382 the burner 336 will be activated to heat the air passing therethrough. The vehicle cab therefore might be preheated if desired on a cold morning before the vehicle operator is ready to take a trip. This is the purpose of the timer switch 388 provided in the circuit between the thermostat assembly 344 and the power source 384 in parallel with vehicle ignition switch 394. If the switch 388 is provided with a timer mechanism such that the arm moves to the normally open contact 438, the system will be actuated provided the manual control knob 373 has been set to a preselected position the night before.

FIG. 11 is a chart showing the operational status of each of the major components of the system during different temperature and driving conditions. As previously discussed the auxiliary fan or blower 352 is on whenever the heater system is actuated by the closing of switch 370 and the vehicle ignition switch 394. When the vehicle engine heat exchangers 308, 310 are being cycled to modulate the temperature of the air about the desired temperature the booster heater 328 alternately receives heated air from the heat exchangers or unheated air through flap valve 358 from the auxiliary blower 352. The chart in FIG. 11 shows this operation prevails for example during all driving conditions at 60° F. (16° C.) and during highway driving as well as steep uphill driving at plus 40° F. (5° C.). This is indicated on the chart by the notation that the heat exchange valves 316, 318 and the flap valve 358 are cycling under these conditions. The chart also shows that the vehicle heat exchangers are insufficient to satisfy the demand at −20° F. (−29° C.) during all driving conditions as well as during city driving, idling and steep downhill driving at plus 40° F. (5° C.). At idling speeds the engine blower 302 is incapable of satisfying the desired air flow to the system so that the auxiliary blower 352 is providing air through the flap valve 358. This is shown on the chart wherein it is indicated that the flap valve 358 is open under all temperature conditions at idling speed.

*Description of FIG. 12 embodiment*

FIG. 12 shows another preferred embodiment of a heater system embodying the teachings of this invention. The system designated 500 in FIG. 12 is substantially identical to that shown in FIG. 1 except that it includes an auxiliary blower 502 for providing additional air to the system under those driving conditions when an engine blower is not adequate. Since the systems are so much alike the same reference numerals will be used on similar components which include the engine blower 12, air passages 22, 24, vehicle engine heat exchangers 14, 16, exhaust conduits 18, 20, heat exchanger valves 28, 29, their respective actuators 86, 87, booster heater 34 and air distribution passages 50 to the vehicle cab 51. The thermostat control assembly 504 is preferably of the type discussed briefly with respect to the system 300 of FIG. 9 and to be described in more detail hereinafter.

The auxiliary air blower 502 is driven by electric motor 506 which also drives the fuel pump 508 for supplying fuel through the fuel line 54 to the burner 52. An additional air blower 510 driven by the motor 506 provides combustion air for the booster heater burner 52 through the conduit 56.

The air from the auxiliary blower 502 is transported through air passage conduit 512 to the bypass air passage 40. A flap valve 514 controls the flow of air from the auxiliary blower to the bypass conduit 40 responsive to the pressure differential between the air supplied by the auxiliary air blower and the air passing through the vehicle heat exchangers 14, 16. That is, if the volumetric air flow rate of the vehicle engine blower 12 is sufficient to cause the air pressure on the downstream side of valve 514 to be greater than the pressure of the air supplied by the auxiliary blower 502, the valve 514 will be closed. However, if the pressure of the air from the vehicle engine blower 12 is less than that of the auxiliary air the valve 514 will be opened in accordance with the pressure differential.

In the system of FIG. 12 the heat demand for maintaining the desired temperature setting of thermostat 504 will be satisfied by the cycling of hot air from the vehicle engine heat exchangers 14, 16 and cool air from the cool air bypass. The action of heat exchanger valves 28, 29 and cool air bypass valve 42 provides the modulation cycling.

During periods of higher heat demand governed by thermostat 504, the booster heater 34 is actuated to add to the heat provided by the engine heat exchangers 14, 16. The heat exchanger valves 28, 29 no longer cycle but remain open to pass engine heat exchanger heated air to the booster heater 34 while the cool air bypass valve 42 remains closed. The burner 52 of the booster heater 34 now cycles on and off to modulate the temperature of the air passing the thermostat about a temperature slightly below the desired temperature set by the operator.

Figure 13:
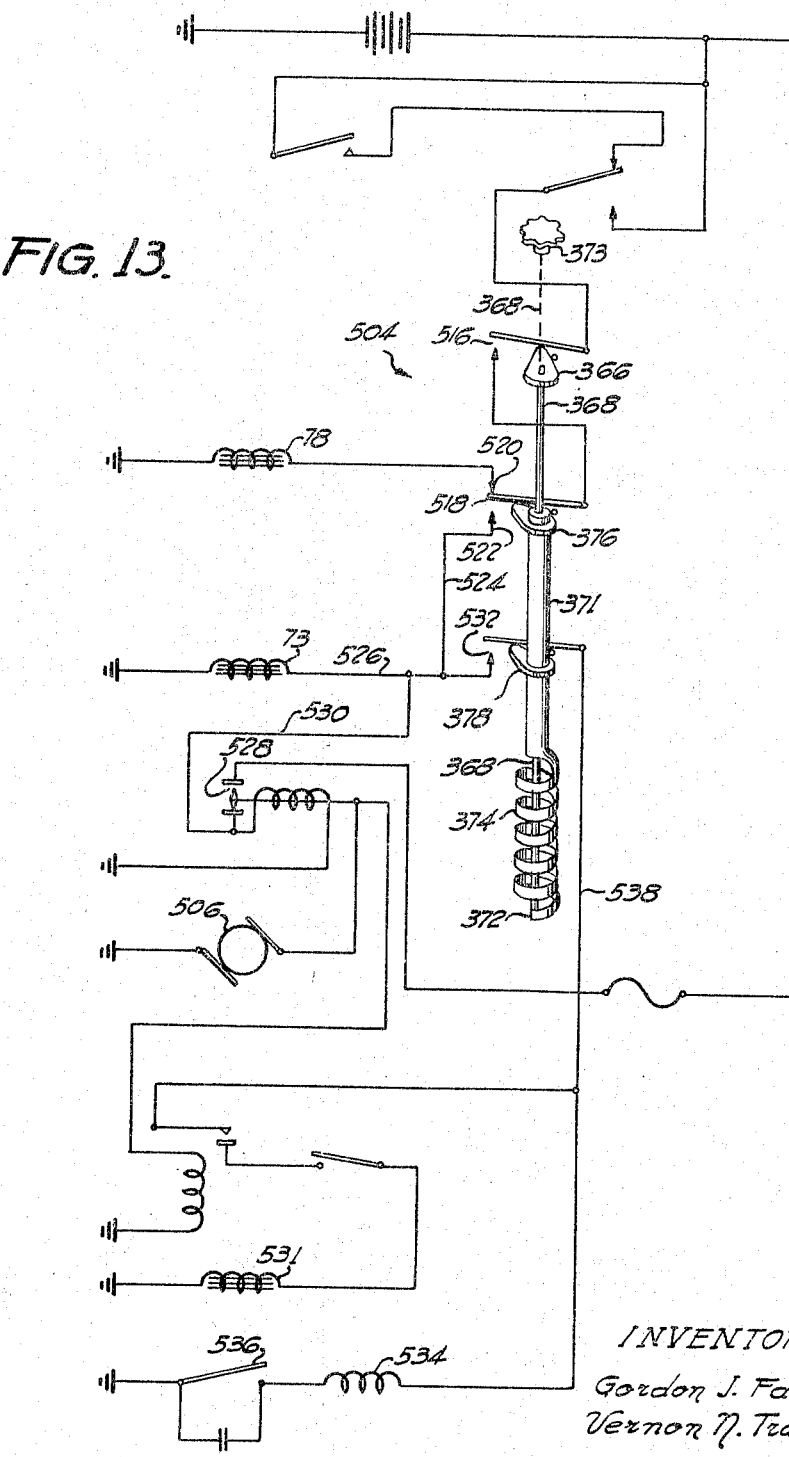
FIG. 13 is a schematic diagram of a circuit for operating the system of FIG. 12.

The preferred circuit for controlling the system of FIG. 12 is shown in FIG. 13 and utilizes the same type of thermostat assembly 504 as shown at 344 in FIG. 10. The component elements thereof are therefore given the same reference numbers.

Actuation of the system is accomplished by rotating the knob 373 in counterclockwise direction which causes cam 366 to close the main control switch 516 as it leaves the home position. If the temperature of the bimetal 374 is not too low at the time of system actuation cam 376 will be in the position shown to cause switch arm 518 to engage contacts 520 and complete the circuit to the cool air bypass solenoid valve 78. If, however, the bimetal 374 is subjected to a very low temperature, cam 376 will be in a more counterclockwise position than shown so that switch arm 518 engages contacts 522 to complete the circuit to the heat exchanger solenoid valve 73 through the circuit from contact 522 including conductor 524, and conductor 526. Air for the system is therefore provided through the vehicle heat exchangers 14, 16 which will be warmed if the vehicle engine is operating. It may be seen that in this circuit the motor 506 for driving the auxiliary blower 502, fuel pump 508 and additional air combustion blower 510 is adapted to be actuated with the heat exchanger valve 73 through time delay switch 528, conductor 530 and conductor 524 to switch contact 522. Thus, the motor 506 will cycle with the heat exchanger valve 73 but with a slight delay in cutting off so that the combustion air can purge the combustion gases from the booster heater burner 52. With a slight modification, however, the motor 506 may be made to operate whenever the system is turned on as is the case in FIG. 10 by connecting conductor 530 directly to the main control switch 516 instead of to conductor 524 leading to switch contact 522.

If the temperature level set by the operator is such that the vehicle heat exchangers 14, 16 can satisfy the demand the bimetal 374 will cause cam 376 to cyclically move switch arm 518 between contacts 520, 522 to cycle heated and cool air to the non-operating booster heater 34. If, however, the temperature level set by the operator is such that the vehicle heat exchangers cannot satisfy the demand, switch 532 will be actuated by cam 378 completing the circuit for the fuel solenoid valve 531, ignition coil 534 and breaker points 536 through conductor 538. The booster heater will be cycled on and off to modulate the temperature of the air passing the thermostat 504 about a temperature slightly below the desired air temperature.

The chart in FIG. 14 shows the operational status of the major components of the system of FIG. 12 for various driving and temperature conditions. Since the system of FIG. 12 is quite similar to the system of FIG. 1 the vehicle heat exchange valves, the bypass valve 42 and burner 52 have the same operational status for each condition. This chart adds the engine fan 12, auxiliary blower 502, and the flap valve 514 included in this system. As in the previous systems the booster heater 34 is required for all driving conditions at −20° F. (−29° C.) and during city driving, idling and steep downhill driving at 40° F. (5° C.). For all other conditions the vehicle heat exchanger is able to satisfy the demand, and the vehicle heat exchanger valves 28, 29 cycle with air bypass valve 42 to modulate the air temperature.

During most driving conditions the engine blower 12 satisfies the air volume requirement so that check valve 514 is closed. The chart of FIG. 14 shows that it is open, however, at idling speeds when the engine blower output is inadequate.

Figure 15:
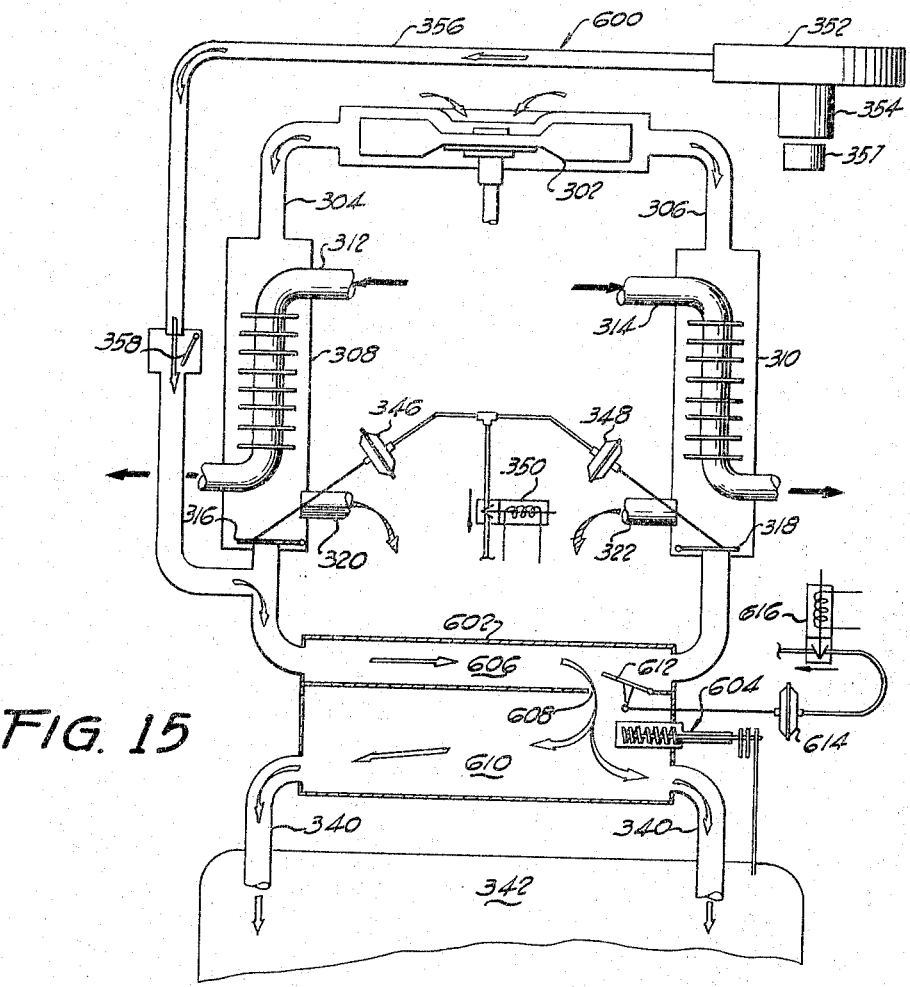
FIG. 15 is a diagrammatic illustration of a heating system similar to that of FIG. 9 in which the booster heater is replaced by an air mixer chamber assembly.

Description of FIG. 15 embodiment

The system 600 shown in FIG. 15 is similar to the system shown in FIG. 9 except that the booster heater is replaced by an air mixer chamber assembly 602, such as described with respect to FIG. 7. This system is also designed for more moderate temperature zones. Corresponding reference numerals are used in FIG. 15 to designate components similar to those in FIG. 9.

Figure 16:
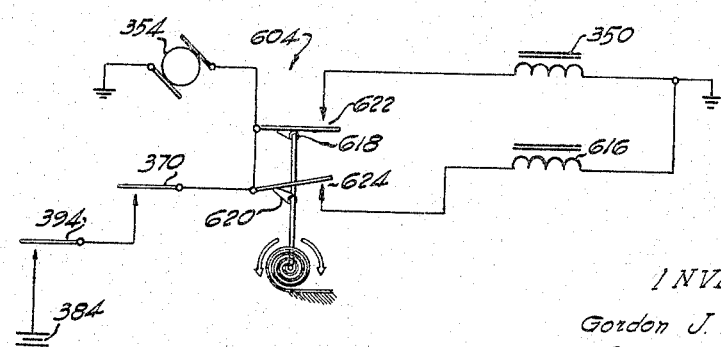
FIG. 16 is a circuit diagram of an electric circuit for operating the system of FIG. 15.

When the vehicle heat exchangers 308, 310 are able to satisfy the heat demand of thermostat assembly 604, air from the engine blower 302 and warmed by heat exchangers 308, 310 is cycled with cool air provided from the auxiliary blower 352 through air passage conduit 356 and flap valve 358. The air from the heat exchangers 308, 310 or auxiliary fan 352 passes through the inlet plenum 606 of the air mixer assembly 602 through port 608 into outlet plenum 610 wherein the thermostat 604 senses the temperature. The air is then distributed through air passages 340 to the vehicle cab 342. An air restrictor valve 612 is provided in port 608 to reduce the flow of air therethrough when the vehicle heat exchangers 308, 310 cannot satisfy the heat demand such as during a long downhill stretch of highway when the engine is lightly loaded. The valve 612 reduces the flow rate of air through the system allowing the vehicle heat exchangers 308, 310 to warm it to a higher temperature. Restrictor valve 612 is operated by a vacuum actuator 614 which is controlled by solenoid valve 616. Solenoid valve 616 is actuated along with the solenoid valve 350 for the heat exchanger valves 316, 318 by the circuit shown in simplified form in FIG. 16. As the system is actuated by the closure of vehicle ignition switch 394 and main control switch 370 the motor 354 driving the auxiliary air blower 352 is actuated to provide ventilating air to the vehicle cab 342 even if there is no heat demand indicated by the position of thermostat cams 618, 620. If the operator manipulates his control to a position where heat is required by the system, cam 618 closes switch 622 to energize the heat exchanger solenoid valve 350 and open valves 316, 318. Heat exchanger heated air therefore passes to the air mixer assembly 602. An increase in the air temperature caused by the heat transferred thereto and detected by thermostat 604 rotates cam 618 in a counterclockwise direction. Eventually switch 622 will open to cause valves 316, 318 to close off the heated air passages from the engine heat exchangers and permit cool air to flow from the auxiliary air blower 352. The cool air causes the cam 618 to rotate in a clockwise direction again closing the switch 622 and causing hot air to be provided to the air mixer assembly 602. The temperature of the air is thus modulated about the desired level.

If the vehicle heat exchangers 308, 310 are inadequate to satisfy the temperature setting of the thermostat the cams 318, 320 will continue to rotate in the counterclockwise direction to close switch 624 and actuate the solenoid valve 616 for operating the air restrictor valve 612. The air flow will be restricted until such time as the vehicle heat exchangers 308, 310 can provide sufficient heat to satisfy the demand.

Figure 17:
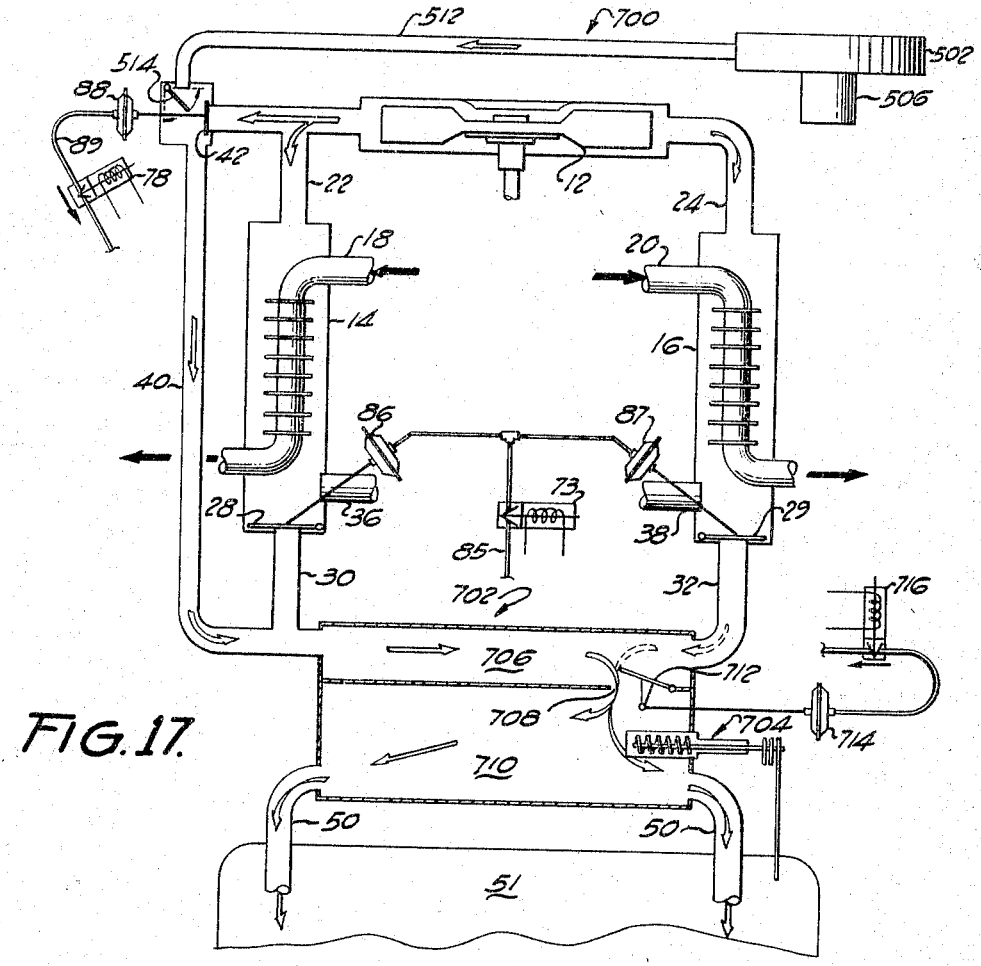
FIG. 17 is a diagrammatic illustration of a heater system similar to that shown in FIG. 12 in which the booster heater is replaced by an air mixer chamber assembly.

Description of FIG. 17 embodiment

FIG. 17 shows a system 700 which is similar to that shown in FIG. 12, again replacing the booster heater with and air mixer assembly 702. Corresponding reference numerals designate the similar components of the systems.

In this example as in the example in FIG. 12 the engine blower 12 forces air through the heat exchangers 14, 16 which is either passed to atmosphere through outlets 36, 38 or passed to the air mixer assembly 702 as determined by the position of heat exchanger valves 28, 29. The heated air from the vehicle heat exchangers 14, 16 is cycled alternately with cool air provided from the blower 12 through bypass 40 by action of the bypass valve 42 with the heat exchanger valves 28, 29 to modulate the air temperature about a desired level determined by the manual setting of the thermostat assembly 704. The auxiliary air blower 502 provides additional air to the system if and when the engine blower 12 is unable to satisfy the minimum desired volumetric flow rate established by the capacity of the auxiliary blower 502. This is accomplished by action of the flap valve 514, whose position is determined by the pressure differential between the air provided by the auxiliary blower 502 and the engine blower 12.

The air from the vehicle engine heat exchangers 14, 16 and/or the air bypass 40 is directed into the inlet plenum 706 of the air mixer assembly 702 and through port 708 to the outlet plenum 710 whereat its temperature is sensed by thermostat assembly 704. Air is distributed through the outlet plenum 710 through air distribution passages 50 to the vehicle cab 51. An air restrictor valve 712 is located at the port 708 which is normally open, but restricts the flow of air when the vehicle heat exchangers 15, 16 are inadequate to satisfy the heat demand, as previously described in other examples. The air restrictor valve 712 is actuated by vacuum actuator 714 which is controlled by air restrictor solenoid valve 716.

Figure 18:
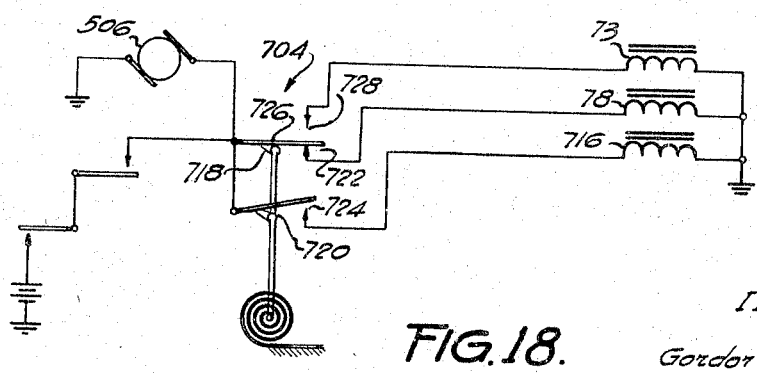
FIG. 18 is a schematic diagram of an electrical circuit for operating the system of FIG. 17.

FIG. 18 shows a simplified circuit for operating the system of FIG. 17. As may be seen the motor 506 driving the auxiliary air blower 502 is operated immediately upon actuation of the system. Cams 718 and 720, the positions of which are set by the operator, actuate the respective switches 722 and 724 to control the various valves. If the manually set position of the cams 718, 720 is such that no heat is required, switches 722 and 724 are in their indicated position in FIG. 18 with solenoid valve 78 causing air bypass valve 42 to open to pass cool air through the system. If the cams have been set to a heat demand position, cam 718 will be in a more clockwise position so that switch arm 726 engages contact 728 to close the circuit for energizing heat exchanger solenoid valve 73.

Air heated by the engine heat exchangers 14, 16 is thus directed to the plenum air mixer assembly 702. As the temperature of the air passing the thermostat 704 increases, the cams rotate in a counterclockwise direction eventually moving switch arm 726 to its other position to deenergize solenoid valve 73 and energize the air bypass solenoid valve 78 to provide cool air to the air mixer assembly 702. The cams cycle thusly and the temperature of the air passing the thermostat assembly 704 is modulated about a temperature level set by the operator.

If, however, the vehicle heat exchangers 14, 16 are inadequate under certain driving conditions to satisfy the temperature setting of the thermostat, the cams will be rotated to a clockwise position at which switch 724 is closed to energize solenoid 716 and cause the air restrictor valve 712 to reduce the flow of air through the system. The air travelling through the heat exchangers 14, 16 thus is heated to a higher temperature before it is distributed to the vehicle cab.

Thermostat control assembly

The physical construction of a preferred thermostat switch assembly to be used with the systems of this invention is shown in FIGS. 19 through 22. This switch is similar to that shown in the patent of E. D'Luzansky No. 2,803,723. Referring to FIG. 19, the thermostatic switch 800 has its several operating elements attached to a plate 802 provided with holes 804 which are for the purpose of mounting the thermostat in an appropriate location. A bearing bushing 806 (FIG. 20) is secured through an opening in the plate 10 as by staking, and this bushing serves to journal a sleeve 808 which in turn journals a smaller diameter shaft 810. To the right of the plate 802 as viewed in FIG. 20, the shaft 810 is secured by a set screw 812 to a collar 814 connected to one end of a helical thermostatic bimetal element 816. The opposite end of the bimetal element 816 is fixed to the end of the central shaft 810 which has a slot 820 for such purpose.

To the left of plate 802 as viewed in FIG. 20 a first cam 822 is secured to the central shaft 810. A second cam 824 is secured to the far end of the shaft 810. On each of the cams 822, 824 the major portion of the contacting surfaces are cylindrical and concentric with the shaft 810 as indicated at 826 in FIG. 19, with a large lobe 822 for engaging switch arms 830, 832, respectively, of precision type snap switches 834 and 836. The cams 822 and 824 are arranged so that their respective switches are actuated at slightly different angular positions of shafts 810 for the purposes described in the foregoing description of the heating systems.

In order to prevent excessive rotation of the cams 822, 824 an outwardly extending finger or wing 838 is provided on cam 822 having a length such that it is brought against the top of the housing for the switch 836 to prevent rotation thereof in either direction beyond its desired range of movement.

The sleeve 808 carries its end to the left of plate 802, as seen in FIG. 20, a cam 840 for actuating the switch arm 842 of a precision type snap switch 844. This is the main heater control switch referred to in the description of the systems.

The sleeve 808 also has fixed thereto a pinion gear 846 (FIGS. 20 and 21) held between two retainer rings 848, 850.

A lever 852 has its lower end pivoted to a pin 56 secured in the plate 802 at a position somewhat below the bushing 806. The lever 852 has an arcuate opening 856 therein with gear teeth 858 formed along one edge thereof. The lever 852 pivoted to plate 802 and the pinion gear 846 fixed to sleeve 808 lie in the same plane so that the gear teeth 858 mesh with the pinion gear 846 and rotate the sleeve 808 as the lever 852 is rotated about its pivot 854.

The lever 852 is actuated by a Bowden wire 860, the protective sheath 862 thereof being fixed with respect to the plate 802 by a clip support 864. The wire 860 is received by a pivotable connector 866 so that axial movement of the wire 860 causes the lever 852 to be rotated about its pivot 854.

The switch 800 is adjusted so that at its home position defined by the most counterclockwise position of the lever 852, the cam 840 is in engagement with the switch arm 842 to hold it in its off position as shown in FIG. 22. As the Bowden wire 860 is pulled to the right as shown in FIG. 22, the gear teeth 858 on lever 852 will rotate the sleeve 808 and cam 840 in a clockwise direction to release switch arm 842 and close the contacts of the switch 844. Further movement of the Bowden wire 860 to the right causes the sleeve 808 to rotate the helical bimetal 816 fixed thereto which in turn rotates the central shaft 810 carrying cams 822 and 824 to a set position determined by the axial length of movement of the Bowden cable 860 manually controlled by the operator for selecting his desired temperature.

The switch herein described has a great degree of sensitivity over wide temperature range of adjustment beyond what is ordinarily available in other types of thermostatic switches. The arrangement of the switches including the main control switch 844 and the bimetal operated switches 834, 836 permits the use of one control lever or knob for actuating the system and setting the desired temperature level. This is to be contrasted with the present day vehicle heater systems requiring at least two and sometimes as many as five different control actuators.

While there has been described herein a number of preferred embodiments utilizing the teachings of this invention, it is recognized that many modifications and additions may be made thereto without materially deviating from the invention. For example, all of the valves actuated by vacuum actuators in the described systems may be replaced by electrically actuated valves. In appropriate systems the valves might even be operated by hydraulic or pneumatic means.

Although all of the systems hereinbefore described show vehicle heat exchangers in which the air is heated by exhaust gases, it is recognized that other means may be used to transfer engine generated heat to the heater system air. For example the air for cooling air cooled engines may be used directly as the heated air source and cycled with cool unheated air to maintain the desired temperature level. In addition the systems of FIGS. 7, 9, 12, 15 and 17 might be modified to use the engine exhaust bypass around the vehicle engine heat exchangers as shown in the system of FIG. 5.

It is obvious that many other modifications may be made to the systems described. It is therefore intended that this invention should not be limited by the foregoing description of those embodiments, but only by the scope of the appended claims.

What is claimed is:

1. A heating system for the cab of a vehicle or the like having a fuel burning engine and engine exhaust means, comprising a first air blower, an air passage between said blower and said vehicle cab, a heat exchanger including said engine exhaust means for transferring heat from the engine exhaust to air in said air passage, an auxiliary air blower of a desired minimum volumetric flow rate connected to said passage, a valve between said auxiliary blower and said passage operable responsive to pressure differentials between air supplied by said first blower and said auxiliary blower to pass air to said passage when the volumetric air flow rate of said first blower is below the desired minimum, means for preventing said heat exchanger from heating the air passing to said vehicle cab, and means responsive to the temperature of the air passing to said vehicle cab for actuating and de-actuating said heat exchanger preventing means to modulate the temperature of the air about a selected temperature.

2. A heating system for the cab of a vehicle or the like having a fuel burning engine and engine exhaust means comprising a first air blower, an air passage between said blower and said vehicle cab, a heat exchanger including said engine exhaust means for transferring heat from the engine exhaust to the air in said air passage, an auxiliary air blower of a desired minimum flow rate connected to said passage, a valve between said auxiliary blower and said passage operable responsive to pressure differentials between air supplied by said first blower and said auxiliary blower to pass air to said passage when the volumetric air flow rate of said first blower is below the desired minimum, means for preventing said heat exchanger from heating air passing to said vehicle cab, means responsive to the temperature of the air passing to said vehicle cab for actuating and de-actuating said heat exchanger preventing means to modulate the temperature of said air about a selected temperature, a booster heater for heating air in said passage, and means responsive to the temperature of the air passing to said vehicle cab for actuating said booster heater if the heat transferred by said heat exchanger is insufficient to maintain the selected air temperature.

3. A heating system for the cab of a vehicle or the like having a fuel burning engine and engine exhaust means, comprising a first air blower, an air passage between said blower and said vehicle cab, a heat exchanger including said engine exhaust means for transferring heat from the engine exhaust to air in said air passage, an auxiliary air blower of a desired minimum volumetric flow rate connected ot said passage, a valve between said auxiliary blower and said passage operable responsive to pressure differentials between air supplied by said first blower and said auxiliary blower to pass air to said passage when the volumetric air flow rate of said first blower is below the desired minimum, means for preventing said heat exchanger from heating air passing to said vehicle cab, means responsive to the temperature of the air passing to said vehicle cab for actuating and de-actuating said heat exchanger preventing means to modulate the temperature of said air about a selected temperature, and means responsive to the temperature of the air passing to said vehicle cab for restricting the air flow to the vehicle cab if the heat transferred to the air by said heat exchanger is insufficient to maintain the selected air temperature.

4. A heating system for the cab of a vehicle or the like having a fuel burning engine, comprising a first air blower, an air passage between said blower and said vehicle cab, a heat exchanger for transferring heat generated by the engine to air in said air passage, an auxiliary air blower of a desired minimum volumetric flow rate connected to said passage, a valve between said auxiliary blower and said passage operable responsive to pressure differentials between air supplied by said first blower and said auxiliary blower to pass air to said passage when the volumetric air flow rate of said first blower is below the desired minimum, means for preventing said heat exchanger from heating air passing to said vehicle cab, and means responsive to the temperature of the air passing to said vehicle cab for actuating and de-actuating said heat exchanger preventing means to modulate the temperature of said air about a selected temperature.

5. A heating system for the cab of a vehicle or the like having a fuel burning engine, comprising a first air blower, an air passage between said blower and said vehicle cab, a heat exchanger for transferring heat generated by the engine to air in said air passage, an auxiliary air blower of a desired minimum volumetric flow rate connected to said passage, a valve between said auxiliary blower and said passage operable responsive to pressure differentials between air supplied by said first blower and said auxiliary blower to pass air to said passage when the volumetric air flow rate of said first blower is below the desired minimum, means for preventing said heat exchanger from heating air passing to said vehicle cab, means responsive to the temperature of the air passing to said vehicle cab for actuating and de-actuating said heat exchanger preventing means to modulate the temperature of said air about a selected temperature, a booster heater for heating air in said passage, and means responsive to the temperature of the air passing to said vehicle cab for actuating said booster heater if the heat transferred by said heat exchanger is insufficient to maintain the selected air temperature.

6. A heating system for the cab of a vehicle or the like having a fuel burning engine, comprising air forcing means, an air passage between said air forcing means and said vehicle cab, a heat exchanger for transferring heat generated by the engine to air in said air passage, means for preventing said heat exchanger from heating air passing to said vehicle cab, means responsive to the temperature of the air passing to said vehicle cab for actuating and de-actuating said heat exchanger preventing means to modulate the temperature of said air about a selected temperature, a valve in said air passage, and means responsive to the temperature of the air passing to said vehicle cab for operating said valve to restrict the air flow to the vehicle cab if the heat transferred to the air by said heat exchanger is insufficient to maintain the selected air temperature.

7. A heating system for the cab of a vehicle or the like having a fuel burning engine, comprising a first air blower, an air passage between said blower and said vehicle cab, a heat exchanger including said engine exhaust means for transferring heat from the engine exhaust to air in said air passage, an auxiliary air blower of a desired minimum volumetric flow rate connected to said passage, a valve between said auxiliary blower and said passage operable to pass air thereto when the volumetric air flow rate of said first blower is below the desired minimum, means for preventing said heat exchanger from heating air passing to said vehicle cab, means responsive to the temperature of the air passing to said vehicle cab for actuating and de-actuating said heat exchanger preventing means to modulate the temperature of said air about a selected temperature, a valve in said air passage, and means responsive to the temperature of the air passing to said vehicle cab for operating said valve to restrict the air flow to the vehicle cab if the heat transferred to the air by said heat exchanger is insufficient to maintain the selected air temperature.

8. In a heating system for the cab of a vehicle having a fuel burning engine, a first air blower, an air passage between the blower and the vehicle cab, and a heat exchanger for transferring heat generated by the engine to the air in the air passage, the improvement in the heater system comprising an auxiliary air blower of a desired minimum volumetric air flow rate connected to said air passage, a valve between said auxiliary blower and said passage operable responsive to pressure differentials between air supplied by said first blower and said auxiliary blower to pass air to said passage when the volumetric air flow rate of said first blower is below said desired minimum, means for preventing said heat exchanger from heating air passing to said vehicle cab, and means responsive to the temperatures of the air passing to said vehicle cab for actuating and de-actuating said heat exchanger preventing means to modulate the temperature of the air about a selected temperature.

9. In a heating system for the cab of a vehicle or the like having a fuel burning engine, a first air blower, an air passage between said blower and said vehicle cab, and a heat exchanger for transferring heat generated by the engine to air in said air passage, the improvement in the heater system comprising an auxiliary air blower of a desired minimum volumetric flow rate connected to said passage, a valve between said auxiliary blower and said passage operable responsive to pressure differentials between air supplied by said first blower and said auxiliary blower to pass air to said passage when the volumetric air flow rate of said first blower is below the desired minimum, means for preventing said heat exchanger from heating air passing to said vehicle cab, means responsive to the temperature of the air passing to said vehicle cab for actuating and de-actuating said heat exchanger preventing means to modulate the temperature of said air about a selected temperature, a booster heater for heating air in said passage, and means responsive to the temperature of the air passing to said vehicle cab for actuating said booster heater if the heat transferred by said heat exchanger is insufficient to maintain the selected air temperature.

10. In a heating system for the cab of a vehicle or the like having a fuel burning engine, air forcing means, air passage means between said air forcing means and said vehicle cab, and a heat exchanger for transferring heat generated by the engine to air in said air passage means, the improvement in the heating system comprising means for preventing said heat exchanger from heating air passing to said vehicle cab, and means responsive to the temperature of the air passing to said vehicle cab actuating and de-actuating said heat exchanger preventing means to modulate the temperature of said air about a selected temperature, a valve in said passage of said heat exchanger, and means responsive to the temperature of the air passing to said vehicle cab for restricting the air flow to the vehicle cab if the heat transferred to the air by said heat exchanger is insufficient to maintain the selected air temperature.

11. In a heating system for the cab of a vehicle or the like having a fuel burning engine, a first air blower, an air passage between said blower and said vehicle cab, and a heat exchanger for transferring heat generated by the engine to air in said air passage, the improvement in the heater system comprising an auxiliary air blower of a desired minimum volumetric flow rate connected to said passage, a valve between said auxiliary blower and said passage operable to pass air thereto when the volumetric air flow rate of said first blower is below the desired minimum, means for preventing said heat exchanger from heating air passing to said vehicle cab, means responsive to the temperature of the air passing to said vehicle cab for actuating and de-actuating said heat exchanger preventing means to modulate the temperature of said air about a selected temperature, a valve in said passage of said heat exchanger and means responsive to the temperature of the air passing to said vehicle cab for restricting the air flow to the vehicle cab if the heat transferred to the air by said heat exchanger is insufficient to maintain the selected air temperature.

12. In a heating system for the cab of a vehicle having a fuel burning engine, at least one engine exhaust conduit, at least one heat exchanger including a portion of the engine exhaust conduit and having an air passage for transferring heat from the engine exhaust to air passing therethrough, and at least one passage for distributing air to the vehicle cab, the improvement in the heater system comprising a substantially constant speed air blower connected to the air passage of said heat exchanger, a combustion type booster air heater having an air passage connected between said heat exchanger air passage and said air distribution passage, said booster heater also having a spark igniter and a solenoid valve for controlling the flow of fuel into said booster heater, means for passing said heat exchanger heated air to atmosphere, a first valve normally blocking the passage of heat exchanger heated air to said booster heater and adapted to alternatively block the passage of heated air to atmosphere, another air passage in parallel connection with said heat exchanger air passage between said blower and said booster heater air passage, a second valve normally closing said other passage, solenoid means for operating said first and second valves, a thermostat having a bimetal element in the air output of said booster heater and a shaft operable by said bimetal to rotate in one direction responsive to decreasing temperatures and in the other direction responsive to increasing temperatures, a control device for manually rotating said shaft and bimetal to select a desired temperature, a switch for actuating said air blower and condition said thermostat, said switch also operable to actuate said first valve solenoid means to cause heated air to pass from said heat exchanger to said booster heater, a first cam on said shaft and rotationally fixed contacts associated therewith operable to cyclically actuate and de-actuate said first and second solenoid means to cause the air passing said thermostat to be modulated about said desired temperature, a second cam on said shaft and other rotationally fixed contacts associated therewith operable to cyclically actuate and de-actuate said fuel solenoid and said spark igniter, said second cam adjusted to operate its associated contacts at a temperature approximately 15° F. lower than the contact operating point of said first cam to cause said booster to modulate the temperature of the air passing the thermostat about a temperature approximately 15° F. lower than said desired temperature if the heat transferred by said heat exchanger is insufficient to maintain said desired temperature.

13. In a heating system for the cab of a vehicle having a fuel burning engine, at least one engine exhaust conduit, at least one heat exchanger including a portion of the engine exhaust conduit and having an air passage for transferring heat from the engine exhaust to air passing therethrough, and at least one passage for distributing air to the vehicle cab, the improvement in the heater system comprising a substantially constant speed air blower connected to the air passage of said heat exchanger, having an air passage connected between said heat exchanger air passage and said air distribution passage, said booster heater also having a spark igniter and a solenoid valve for controlling the flow of fuel into said booster heater, an exhaust bypass exterior of said heat exchanger around said exhaust conduit portion, a first valve normally closing said exhaust conduit portion and adapted to alternatively close said exhaust bypass, solenoid means for operating said valve, a thermostat having a bimetal element in the air output of said booster heater and a shaft operable by said bimetal to rotate in one direction responsive to decreasing temperatures and in the other direction responsive to increasing temperatures, a control device for rotating said shaft and bimetal to select a desired temperature, a switch for actuating said air blower, said switch also operable to actuate said valve solenoid means to cause engine exhaust to pass through said exhaust conduit portion in said heat exchanger, a first cam on said shaft and rotationally fixed contacts associated therewith operable to cyclically actuate and de-actuate said first solenoid means to cause the air passing said thermostat to be modulated about said desired temperature, a second cam on said shaft and other rotationally fixed contacts associated therewith operable to cyclically actuate and de-actuate said fuel solenoid and said spark igniter, said second cam adjusted to operate its associated contacts at a temperature approximately 15° F. lower than the contact operating point of said first cam to cause said booster to modulate the temperature of the air passing the thermostat about a temperature approximately 15° F. lower than said desired temperature if the heat transferred by said heat exchanger is insufficient to maintain said desired temperature.

14. In a heating system for the cab of a vehicle having a fuel burning engine, at least one engine exhaust conduit, at least one heat exchanger including a portion of the engine exhaust conduit and having an air passage therethrough for transferring heat from the engine exhaust to air passing therethrough, and at least one passage for distributing air to the vehicle cab, the improvement in the heater system comprising a substantially constant speed air blower connected to the air passage of said heat exchanger, an air mixer chamber having an air passage connected between said heat exchanger air passage and said air distribution passage, said air mixer chamber having a normally open valve for restricting air flow therethrough, solenoid means for operating said valve, means for passing said heat exchanger heated air to atmosphere, a first valve normally blocking the passage of heat exchanger heated air to said air mixer chamber and adapted to alternatively block the passage of heated air to atmosphere, another air passage in parallel connection with said heat exchanger air passage between said first blower and said booster heater air passage, a second valve normally closing said other passage, solenoid means for operating said first and second valves, a thermostat having a bimetal element in the air output of said air mixer chamber and a shaft operable by said bimetal to rotate in one direction responsive to increasing temperatures, a control device for manually rotating said shaft and bimetal to select a desired temperature, a switch for actuating said air blower, said switch also operable to actuate said first valve solenoid means to cause heated air to pass from said heat exchanger to said air mixer chamber, a first cam on said shaft and rotationally fixed contacts associated therewith operable to cyclically actuate and de-actuate said first and second solenoid means to cause said first and second valves to modulate the temperature of the air passing said thermostat about said desired temperature, a second cam on said shaft and other rotationally fixed contacts associated therewith operable to actuate said air mixer valve solenoid means, said second cam adjusted to operate its associated contacts at a temperature approximately 15° F. lower than the contact operating point of said first cam to restrict the flow of air passing said thermostat if the heat transferred by said heat exchanger is insufficient to maintain said desired temperature.

15. In a heating system for the cab of a vehicle having a fuel burning engine, at least one engine exhaust conduit, a first air blower driven by the engine, at least one heat exchanger including a portion of the engine exhaust conduit having an air passage connected to said first blower for transferring heat from the engine exhaust to air passing therethrough, and at least one passage for distributing air to the vehicle cab, the improvement in the heater system comprising a combustion type booster air heater having an air passage connected between said heat exchanger air passage and said air distribution passage, said booster heater also having a spark igniter and a solenoid valve for controlling the flow of fuel into said booster heater, means for passing said heat exchanger heated air to atmosphere, a first valve normally blocking the passage of heat exchanger heated air to said booster heater and adapted to alternatively block the passage of heated air to atmosphere, solenoid means for operating said first valve, an auxiliary air blower of a desired volumetric flow rate, another air passage connecting said auxiliary air blower to said booster heater air passage, another valve in said other passage operable to pass air therethrough when the volumetric flow rate of said first blower is below the desired minimum, a fuel pump and a blower driven with said auxiliary blower for providing fuel and combustion air to said booster air heater, a thermostat having a bimetal element in the air output of said booster heater and a shaft operable by said bimetal to rotate in one direction responsive to decreasing temperatures and in the other direction responsive to increasing temperatures, a control device for manually rotating said shaft and bimetal to select a desired temperature, a switch operable upon manual movement of said device away from a home position in the one direction towards the desired temperature setting for actuating said auxiliary air blower, said combustion air blower and said fuel pump, said switch also operable upon the manual movement of said device away from the home position to actuate said first valve to cause heated air to pass from said heat exchanger to said booster heater, a first cam on said shaft and rotationally fixed contacts associated therewith operable to cyclically actuate and de-actuate said first valve solenoid means to cause the air passing said thermostat to be modulated about said desired temperature, a second cam on said shaft and other rotationally fixed contacts associated therewith operable to cyclically actuate and de-actuate said fuel solenoid and said spark igniter, said second cam adjusted to operate its associated contacts at a temperature approximately 15° F. lower than the contact operating point of said first cam to cause said booster to modulate the temperature of the air passing said thermostat about a temperature approximately 15° F. lower than said desired temperature if the heat transferred by said heat exchanger is insufficient to maintain said desired temperature.

16. In a heating system for the cab of a vehicle having a fuel burning engine, at least one engine exhaust conduit, a first air blower driven by the engine, at least one heat exchanger including a portion of the engine exhaust conduit having an air passage connected to said first blower for transferring heat from the engine exhaust to air passing therethrough, and at least one passage for distributing air to the vehicle cab; the improvement in the heater system, comprising a combustion type booster air heater having an air passage connected between said heat exchanger air passage and said air distribution passage, said booster heater also having a spark igniter and a solenoid valve for controlling the flow of fuel into said booster heater, means for passing said heat exchanger heated air to atmosphere, a first valve normally blocking the passage of heat exchanger heated air to said booster heater and adapted to alternatively block the passage of heated air to atmosphere, another air passage in parallel connection with said heat exchanger air passage between said first blower and said booster heater air passage, a second valve normally closing said other passage, solenoid means for operating said first and second valves, an auxiliary air blower of a desired volumetric flow rate connected to said other air passage, a third valve between said auxiliary blower and said other passage operable to pass air thereto when the volumetric flow rate of said first blower is below the desired minimum, a fuel pump and a blower driven with said auxiliary blower for providing fuel and combustion air to said booster air heater, a thermostat having a bimetal element in the air output of said booster heater and a shaft operable by said bimetal to rotate in one direction responsive to decreasing temperatures and in the other direction responsive to increasing temperatures, a control device for manually rotating said shaft and bimetal to select a desired temperature, a switch operable upon manual movement of said device away from a home position in the one direction towards the desired temperature setting for actuating said auxiliary air blower, said combustion air blower and said fuel pump, said switch also operable upon the manual movement of said device away from the home position in said one direction to actuate said first valve solenoid means to cause heated air to pass from said heat exchanger to said booster heater, a first cam on said shaft and rotationally fixed contacts associated therewith operable to cyclically actuate and de-actuate said first and second valve solenoid means to cause said first and second valves to modulate the temperature of the air passing said thermostat about said desired temperature, a second cam on said shaft and other rotationally fixed contacts associated therewith operable to cyclically actuate and de-actuate said fuel solenoid and said spark igniter, said second cam adjusted to operate its associated contacts at a temperature approximately 15° F. lower than the contact operating point of said first cam to cause said booster to modulate the temperature of the air passing said thermostat about a temperature approximately 15° F. lower than said desired temperature if the heat transferred by said heat exchanger is insufficient to maintain said desired temperature.

17. In a heating system for the cab of a vehicle having a fuel burning engine, at least one engine exhaust conduit, a first air blower driven by the engine, at least one heat exchanger including a portion of the engine exhaust conduit and having an air passage connected to said first blower for transferring heat from the engine exhaust to air passing therethrough, and at least one passage for distributing air to the vehicle cab, the improvement in the heater system comprising an air mixer chamber having an air passage connected between said heat exchanger air passage and said air distribution passage, said air mixer chamber having a normally open valve for restricting air flow therethrough, solenoid means for operating said valve, means for passing said heat exchanger heated air to atmosphere, a first valve normally blocking the passage of heat exchanger heated air to said air mixer chamber and adapted to alternatively block the passage of heated air to atmosphere, solenoid means for operating said first valve, an auxiliary air blower of a desired volumetric flow rate, another air passage connecting said auxiliary air blower to said air mixer chamber, another valve in said other passage operable to pass air therethrough when the volumetric flow rate of said first blower is below the desired minimum, a thermostat having a bimetal element in the air output of said air mixer chamber and a shaft operable by said bimetal to rotate in one direction responsive to decreasing temperatures and in the other direction responsive to increasing temperature, a control device for manually rotating said shaft and bimetal to select a desired temperature, a switch operable upon manual movement of said device away from a home position in the one direction towards the desired temperature setting for actuating said auxiliary air blower, said switch also operable upon the manual movement of said device away from the home position to actuate said first valve solenoid means to cause heated air to pass from said heat exchanger to said air mixer chamber, a first cam on said shaft and rotationally fixed contacts associated therewith operable to cyclically actuate and de-actuate said first valve solenoid means to cause the air passing said thermostat to be modulated about said desired temperature, a second cam on said shaft and other rotationally fixed contacts associated therewith operable to actuate said air mixer valve solenoid means, said second cam adjusted to operate its associated contacts at a temperature approximately 15° F. lower than the contact operating point of said first cam to restrict the flow of air passing said thermostat if the heat transferred by said heat exchanger is insufficient to maintain said desired temperature.

18. In a heating system for the cab of a vehicle having a fuel burning engine, at least one engine exhaust conduit, a first air blower driven by the engine, at least one heat exchanger including a portion of the engine exhaust conduit and having an air passage connected to said first blower for transferring heat from the engine exhaust to air passing therethrough, and at least one passage for distributing air to the vehicle cab, the improvement in the heater system comprising an air mixer chamber having an air passage connected between said heat exchanger air passage and said air distribution passage, said air mixer chamber having a normally open valve for restricting air flow therethrough, solenoid means for operating said valve, means for passing said heat exchanger heated air to atmosphere, a first valve normally blocking the passage of heat exchanger heated air to said air mixer chamber and adapted to alternatively block the passage of heated air to atmosphere, another air passage in parallel connection with said heat exchanger air passage between said first blower and said air mixer chamber air passage, a second valve normally closing said other passage, solenoid means for operating said first and second valves, an auxiliary air blower of a desired volumetric flow rate connected to said other air passage, a third valve between said auxiliary blower and said other passage operable to pass air thereto when the volumetric flow rate of said first blower is below the desired minimum, a thermostat having a bimetal element in the air output of said air mixer chamber and a shaft operable by said bimetal to rotate in one direction responsive to decreasing temperatures and in the other direction responsive to increasing temperatures, a control device for manually rotating said shaft and bimetal to select a desired temperature, a switch operable upon manual movement of said device away from a home position in the one direction towards the desired temperature setting for actuating said auxiliary air blower, said switch also operable upon the manual movement of said device away from the home position to actuate said first valve solenoid means to cause heated air to pass from said heat exchanger to said air mixer chamber, a first cam on said shaft and rotationally fixed contacts associated therewith operable to cyclically actuate and de-actuate said first and second solenoid means to cause the air passing said thermostat to be modulated about said desired temperature, a second cam on said shaft and other rotationally fixed contacts associated therewith operable to cyclically actuate said air mixer valve solenoid, said second cam adjusted to operate its associated contacts at a temperature approximately 15° F. lower than the contact operating point of said first cam to restrict the flow of air passing said thermostat if the heat transferred by said heat exchanger is insufficient to maintain said desired temperature.

19. In a heating system for the cab of a vehicle having a fuel burning engine, at least one engine exhaust conduit, at least one heat exchanger having an air passage therethrough for transferring heat generated by the engine exhaust to air passing therethrough, and at least one passage for distributing air to the vehicle cab, the improvement in the heater system comprising an air blower connected to the air passage of said heat exchanger, a booster air heater having an air passage connected between said heat exchanger air passage and said air distribution passage, means for passing said heat exchanger heated air to atmosphere, a first valve normally blocking the passage of heat exchanger heated air to said booster heater and adapted to alternatively block the passage of heated air to atmosphere, another air passage in parallel connection with said heat exchanger air passage between said air blower and said booster heater air passage, a second valve normally closing said other passage, means for operating said first and second valve operating means, means including a temperature sensitive element and responsive to the temperature of the air passing to said vehicle cab for cyclically actuating and de-actuating said first and second valve operating means to cause the air passing said sensitive element to be modulated about a desired temperature, and means including said temperature sensitive element for cyclically actuating and de-actuating said booster heater if the heat transferred by said heat exchanger is insufficient to maintain the desired temperature.

20. In a heating system for the cab of a vehicle having a fuel burning engine, at least one engine exhaust conduit, at least one heat exchanger including a portion of the engine exhaust conduit and having an air passage therethrough for transferring heat from the engine exhaust to air passing therethrough, and at least one passage for distributing air to the vehicle cab, the improvement in the heater system comprising an air blower connected to the air passage of said heat exchanger, a combustion type booster air heater having an air passage connected between said heat exchanger air passage and said air distribution passage, an exhaust bypass exterior of said heat exchanger around said exhaust conduit portion, a valve normally closing said exhaust conduit portion and adapted to alternatively close said exhaust bypass, means for operating said valve means including a temperature sensitive element and responsive to the temperature of the air passing to said vehicle cab for cyclically actuating and de-actuating said valve operating means to cause the air passing said sensitive element to be modulated about a desired temperature, and means including said temperature sensitive element for cyclically actuating and de-actuating said booster heater if the heat transferred by said heat exchanger is insufficient to maintain the desired temperature.

21. In a heating system for the cab of a vehicle having a fuel burning engine, at least one engine exhaust conduit, at least one heat exchanger having an air passage therethrough for transferring heat generated by the engine exhaust to air passing therethrough, and at least one passage for distributing air to the vehicle cab, the improvement in the heater system comprising an air blower connected to the heat exchanger air passage, an air mixer chamber having an air passage connected between said heat exchanger air passage and said air distribution passage, said air mixer chamber having a normally open valve for restricting air flow therethrough, means for passing said heat exchanger heated air to atmosphere, a first valve normally blocking the passage of heat exchanger heated air to said air mixer chamber and adapted to alternatively block the passage of heated air to atmosphere, another air passage in parallel connection with said heat exchanger air passage between said first blower and said air mixer air passage, a second valve normally closing said other passage, means for operating said first and second valve operating means, means including a temperature sensitive element and responsive to the temperature of the air passing to said vehicle cab for cyclically actuating and de-actuating said first and second valve operating means to cause the air passing said sensitive element to be modulated about a desired temperature, and means including said temperature sensitive element for actuating said air mixing chamber valve if the heat transferred by said heat exchanger is insufficient to maintain the desired temperature.

22. In a heating system for the cab of a vehicle having a fuel burning engine, a first air blower, at least one heat exchanger having an air passage therethrough connected to said first blower for transferring heat generated by the engine to air passing therethrough, and at least one passage for distributing air to the vehicle cab, the improvement in the heater system comprising a booster air heater having an air passage connected between said heat exchanger air passage and said air distribution passage, means for passing said heat exchanger heated air to atmosphere, a first valve normally blocking the passage of heat exchanger heated air to said booster heater and adapted to alternatively block the passage of heated air to atmosphere, means for operating said first valve, an auxiliary air blower of a desired volumetric flow rate, another air passage connecting said auxiliary air blower to said booster heater air passage, another valve in said other passage operable to pass air therethrough when the volumetric flow rate of said first blower is below the desired minimum, means including a temperature sensitive element and responsive to the temperature of the air passing to said vehicle cab for cyclically actuating and de-actuating said first valve operating means to cause the air passing said sensitive element to be modulated about a desired temperature, and means including said temperature sensitive element for cyclically actuating and de-actuating said booster heater if the heat transferred by said heat exchanger is insufficient to maintain the desired temperature.

23. In a heating system for the cab of a vehicle having a fuel burning engine, a first air blower, at least one heat exchanger having an air passage therethrough connected to said first blower for transferring heat generated by the engine to air passing therethrough, and at least one passage for distributing air to the vehicle cab, the improvement in the heater system comprising a booster air heater having an air passage connected between said heat exchanger air passage and said air distribution passage, means for passing said heat exchanger heated air to atmosphere, a first valve normally blocking the passage of heat exchanger heated air to said booster heater and adapted to alternatively block the passage of heated air to atmosphere, another air passage in parallel connection with said heat exchanger air passage between said first blower and said booster heater air passage, a second valve normally closing said other passage, means for operating said first and second valves, an auxiliary air blower of a desired volumetric flow rate connected to said other air passage, a third valve between said auxiliary blower and said other passage operable to pass air thereto when the volumetric flow rate of said first blower is below the desired minimum, means including a temperature sensitive element and responsive to the temperature of the air passing to said vehicle cab for cyclically actuating and de-actuating said first and second valve operating means to cause the air passing said sensitive element to be modulated about a desired temperature, and means including said temperature sensitive element for cyclically actuating and de-actuating said booster heater if the heat transferred by said heat exchanger is insufficient to maintain the desired temperature.

24. In a heating system for the cab of a vehicle having a fuel burning engine, at least one engine exhaust conduit, at least one heat exchanger having an air passage therethrough for transferring heat generated by the engine to air passing therethrough, and at least one passage for distributing air to the vehicle cab, the improvement in the heater system comprising an air blower connected to the air passage of said heat exchanger, an air mixer chamber having an air passage connected between said heat exchanger air passage and said air distribution passage, said air mixer chamber having a normally open valve for restricting air flow therethrough, means for passing said heat exchanger heated air to atmosphere, a first valve normally blocking the passage of heat exchanger heated air to said air mixer chamber and adapted to alternatively block the passage of heated air to atmosphere, solenoid means for operating said first valve, an auxiliary air blower of a desired volumetric flow rate, another air passage connecting said auxiliary blower to said air mixer chamber connected to said other air passage, another valve in said other passage operable to pass air therethrough when the volumetric flow rate of said first blower is below the desired minimum, means including a temperature sensitive element and responsive to the temperature of the air passing to said vehicle cab for cyclically actuating and de-actuating said first valve operating means to cause the air passing said sensitive element to be modulated about a desired temperature, and means including said temperature sensitive element for actuating said air mixing chamber valve if the heat transferred by said heat exchanger is insufficient to maintain the desired temperature.

25. In a heating system for the cab of a vehicle having a fuel burning engine, at least one engine exhaust conduit, at least one heat exchanger having an air passage therethrough for transferring heat generated by the engine to air passing therethrough, and at least one passage for distributing air to the vehicle cab, the improvement in the heater system comprising an air blower connected to the heat exchanger air passage, an air mixer chamber having an air passage connected between said heat exchanger air passage and said air distribution passage, said air mixer chamber having a normally open valve for restricting air flow therethrough, means for passing said heat exchanger heated air to atmosphere, a first valve normally blocking the passage of heat exchanger heated air to said air mixer chamber and adapted to alternatively block the passage of heated air to atmosphere, another air passage in parallel connection with said heat exchanger air passage between said first blower and said booster heater air passage, a second valve normally closing said other passage, means for operating said first and second valves, an auxiliary air blower of a desired volumetric flow rate connected to said other air passage, a third valve between said auxiliary blower and said other passage operable to pass air thereto when the volumetric flow rate of said first blower is below the desired minimum, means including a temperature sensitive element and responsive to the temperature of the air passing to said vehicle cab for cyclically actuating and de-actuating said first and second valve operating means to cause the air passing said sensitive element to be modulated about a desired temperature, and means including said temperature sensitive element for actuating said air mixer chamber valve if the heat transferred by said heat exchanger is insufficient to maintain the desired temperature.

26. In a heating system for the cab of a vehicle having a fuel burning engine, air forcing means, air passage means between the air forcing means and the vehicle cab, and a heat exchanger for transferring engine generated heat to air in the air passage means, the improvement in the heater system comprising means for providing unheated air in said air passage means downstream of said heat exchanger, first valve means having a fully open position and a shut position for respectively passing and preventing the flow of engine heated air in said passage means to said vehicle cab, second valve means having a fully open position and a shut position for respectively passing and preventing the flow of unheated air into said air passage means, means including a manually controlled thermostat operable responsive to the temperature of the air passing through said vehicle cab for cyclically fully opening said first valve means while closing said second valve means and vice versa to cyclically pass heated and unheated air to modulate the temperature of the air passing to the vehicle cab about a desired level.

27. The heating system of claim 26 wherein said unheated air providing means comprises an auxiliary air blower and said second valve means comprises a valve operable responsive to a pressure differential between the output of said air blower and the air in said passage means from said air forcing means.

28. The heating system of claim 26 comprising in addition a booster heater in said air passage means downstream of said unheated air providing means and wherein said thermostat means controls said booster heater to cyclically operate if the heat transferred to the air by said heat exchanger is insufficient to maintain the desired air temperature level so as to modulate the temperature about a level slightly below the desired level.

References Cited

UNITED STATES PATENTS

| | | | |
|---|---|---|---|
| 2,009,823 | 7/1935 | Van Vulpen et al. | 237—5 |
| 2,230,446 | 2/1941 | Baker | 236—9 |
| 2,304,642 | 12/1942 | Hans | 237—2 |
| 2,482,565 | 9/1949 | Tramonti | 236—9 |
| 2,522,287 | 9/1950 | Lehane et al. | 236—9 X |
| 2,529,915 | 11/1950 | Chausson | 237—12.3 |
| 2,640,409 | 6/1953 | Hans | 237—2 |
| 3,170,632 | 2/1965 | Gallie | 237—2 |
| 3,273,799 | 9/1966 | Fairbanks et al. | 237—2 |

EDWARD J. MICHAEL, *Primary Examiner.*